United States Patent
Easwar et al.

(10) Patent No.: US 6,781,717 B1
(45) Date of Patent: Aug. 24, 2004

(54) THRESHOLD SCREENING USING RANGE REDUCTION

(75) Inventors: Venkat V. Easwar, Cupertino, CA (US); Praveen K. Ganapathy, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 869 days.

(21) Appl. No.: 09/713,418

(22) Filed: Nov. 15, 2000

Related U.S. Application Data

(60) Provisional application No. 60/173,641, filed on Dec. 30, 1999.

(51) Int. Cl.[7] .............................................. G06F 15/00
(52) U.S. Cl. ...................... 358/1.9; 358/3.06; 358/3.22
(58) Field of Search ........................ 358/1.1, 1.2, 1.9, 358/3.01, 3.02, 3.03, 3.06, 3.22, 534, 536, 426.04; 382/232, 233, 237, 251, 253

(56) References Cited

U.S. PATENT DOCUMENTS

| | | | | |
|---|---|---|---|---|
| 4,670,851 A | * | 6/1987 | Murakami et al. | 378/121 |
| 5,272,657 A | * | 12/1993 | Basehore et al. | 708/422 |
| 5,379,355 A | * | 1/1995 | Allen | 382/238 |
| 5,586,196 A | * | 12/1996 | Sussman | 382/114 |
| 5,734,791 A | * | 3/1998 | Acero et al. | 704/222 |
| 5,883,973 A | * | 3/1999 | Pascovici et al. | 382/176 |

FOREIGN PATENT DOCUMENTS

| | | | |
|---|---|---|---|
| EP | 0030711a2 | * | 3/1989 |
| WO | wo9903059 | * | 1/1999 |

* cited by examiner

*Primary Examiner*—Gabriel Garcia
(74) *Attorney, Agent, or Firm*—Robert D. Marshall, Jr.; W. James Brady, III; Frederick J. Telecky, Jr.

(57) ABSTRACT

A screening method in a printer for approximating a gray scale tone with a more limited range image producer using a tree search. An input pixel packed data word is compared with a second data word packed with threshold values. The result of the comparison enables selection of a next second data word with thresholds is a narrower range. This process repeats until a comparison with a second data word having adjacent threshold values. The comparing is preferably performed by subtracting the second data word from the first data word in a splittable arithmetic logic unit and storing respective carry outs from each section. The selection of the next second data word uses the stored carry outs from each section. The next second data word can be determined by extracting a left most one of the stored carry outs for use as an index into a table. Alternatively, the stored carry outs can be used directly as an index into a table. An output pixel value is determined for each pixel. This may be computed from the stored carry outs or extracted from a table.

14 Claims, 7 Drawing Sheets index=0; index to threshold table

Gout=1mo(A)*N/4=1*16
index=1+1mo(A);

index=5+(4*1mo(A))+1mo(B);

THRESHOLD SCREENING USING RANGE REDUCTION

This application claims priority under 35 USC §119(e)(1) of Provisional Application No. 60/173,641, filed Dec. 30, 1999.

TECHNICAL FIELD OF THE INVENTION

The technical field of this invention is printers and more particularly the electronics of printers that converts input data in the form of a page description file into control signals for the print engine.

BACKGROUND OF THE INVENTION

Screening is the process of rendering the illusion of continuous-tone pictures on displays that are only capable of producing digital picture elements. In the process of printing images, large gray levels of the input picture have to be simulated by the printing device to reproduce a perfect duplicate of the original image. However, in the printed image the pixel resolution can be limited to that which is perceivable by the eye. Hence by grouping the adjacent pixels it is possible to simulate a continuous tone in the image.

Screening may take place by a threshold method in one of two categories: bi-level threshold screening; and multi-level threshold screening. In bi-level threshold screening the (x,y) coordinates of the input pixel are used to index into a two dimensional m by n matrix. The individual entries in the matrix are gray level thresholds which are compared against the input pixel gray level. A binary value (0 or 1) is output based on the results of the comparison. Multi-level screening indexes into a three dimensional lookup table. This three dimensional lookup table is organized as a two dimensional preference matrix of size M by N. The preference matrix is a repeatable spatial tile in the image space. Each entry of the preference matrix has a number of the tone curve which has to be used for the position of (x,y). The tone curve is the compensation transfer function of the input pixel-gray value range to within range of the printing process. The tone-curve transfer function is quantized based on a set of thresholds and stored in the form of lookup tables. The lookup tables each contain $2^b$ entries for an unscreened input pixel of size b-bits. All the $2^b$ entries contain the corresponding screened output pixel of size c-bits. This process provides a manner of translating the large dynamic range of the input image into the smaller dynamic range of the printer by mixing colors within the printer dynamic range.

SUMMARY OF THE INVENTION

A screening method in a printer for approximating a gray scale tone with a more limited range image producer using a tree search. An input pixel value is packed into equal sections of a first data word. This first data word is compared with an initial second data word holding differing threshold values in the sections. A next second data word is selected based in a based upon a result of said simultaneously comparing within a group with a next reduced range. The first data word is again compared with the next second data word. This process repeats until a comparison with a second data word having adjacent threshold values.

The comparing steps are preferably performed by subtracting the second data word from the first data word in a splittable arithmetic logic unit and storing respective carry outs from each section. The selection of the next second data word uses the stored carry outs from each section. The second data words preferably have threshold values packed in order from highest to lowest. The next second data word can be determined by extracting a left most one of the stored carry outs for use as an index into a table. Alternatively, the stored carry outs can be used directly as an index into a table. An output pixel value is determined for each pixel. This may be computed from the stored carry outs or extracted from a table.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
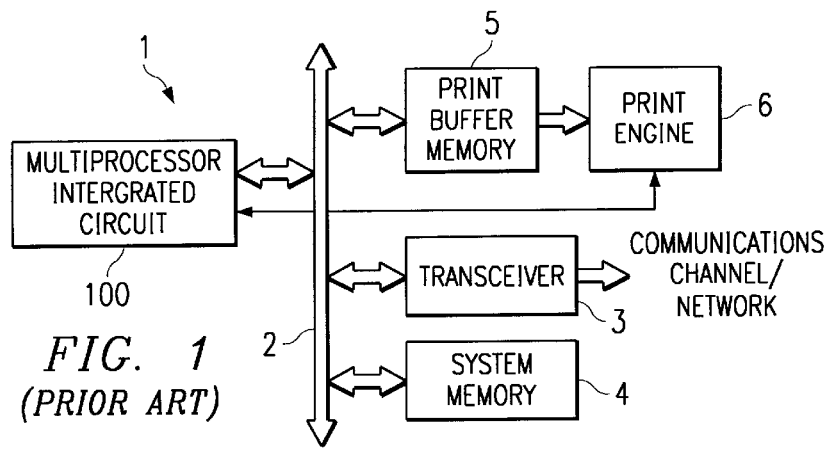
FIG. 1 illustrates the-system architecture of an image processing system such as would employ this invention.

FIG. 1 is a block diagram of a network printer system 1 including a multiprocessor integrated circuit 100 constructed for image and graphics processing according to this invention. Multiprocessor integrated circuit 100 provides the data processing including data manipulation and computation for image operations of the network printer system of FIG. 1. Multiprocessor integrated circuit 100 is bi-directionally coupled to a system bus 2.

FIG. 1 illustrates transceiver 3. Transceiver 3 provides translation and bidirectional communication between the network printer bus and a communications channel. One example of a system employing transceiver 3 is a local area network. The network printer system illustrated in FIG. 1 responds to print requests received via the communications channel of the local area network. Multiprocessor integrated circuit 100 provides translation of print jobs specified in a page description language, such as PostScript, into data and control signals for printing.

FIG. 1 illustrates a system memory 4 coupled to the network printer system bus. This memory may include video random access memory, dynamic random access memory, static random access memory, nonvolatile memory such as EPROM, FLASH or read only memory or a combination of these memory types. Multiprocessor integrated circuit 100 may be controlled either in wholly or partially by a program stored in the memory 4. This memory 4 may also store various types of graphic image data.

In the network printer system of FIG. 1 Multiprocessor integrated circuit 100 communicates with print buffer memory 5 for specification of a printable image via a pixel map. Multiprocessor integrated circuit 100 controls the image data stored in print buffer memory 5 via the network printer system bus 2. Data corresponding to this image is recalled from print buffer memory 5 and supplied to print engine 6. Print engine 6 provides the mechanism that places color dots on the printed page. Print engine 6 is further responsive to control signals from multiprocessor integrated circuit 100 for paper and print head control. Multiprocessor integrated circuit 100 determines and controls where print information is stored in print buffer memory 5. Subsequently, during readout from print buffer memory 5, multiprocessor integrated circuit 100 determines the readout sequence from print buffer memory 5, the addresses to be accessed, and control information needed to produce the desired printed image by print engine 6.

According to the preferred embodiment, this invention employs multiprocessor integrated circuit 100. This preferred embodiment includes plural identical processors that embody this invention. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

Figure 2:
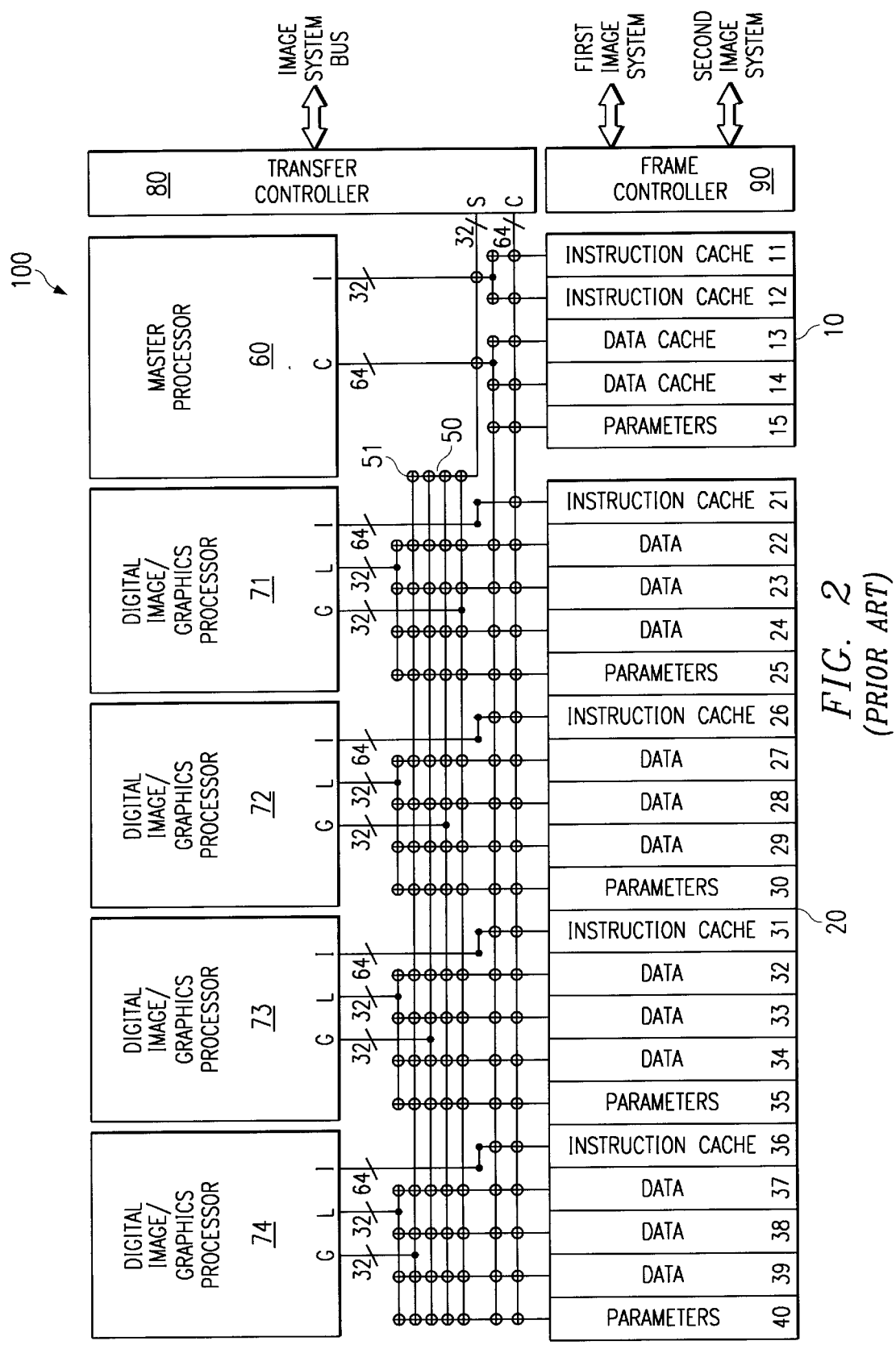
FIG. 2 illustrates the architecture of a single integrated circuit multiprocessor that forms the preferred embodiment of this invention.

FIG. 2 illustrates the architecture of the multiprocessor integrated circuit 100 of the preferred embodiment of this invention. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multi-media computing.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 preferably includes 2 K bytes, with a total memory within multiprocessor integrated circuit 100 of 50 K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit data words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories or random access memory 20. Master Processor 60 includes two memory ports. An instruction port (I) may fetch a 32 bit instruction word from either of the instruction caches 11 and 12. A data port © may read a 32 bit data word from or write a 32 bit data word into data caches 13 or 14, parameter memory 15 of random access memory 10 or any of the data memories, the parameter memories or random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2 K bytes of memory, there is 4 K bytes of instruction cache and 4 K bytes of data cache. Cache control is an integral function of master processor 60. As previously mentioned, master processor 60 may also access other memory sections via crossbar 50.

Figure 3:
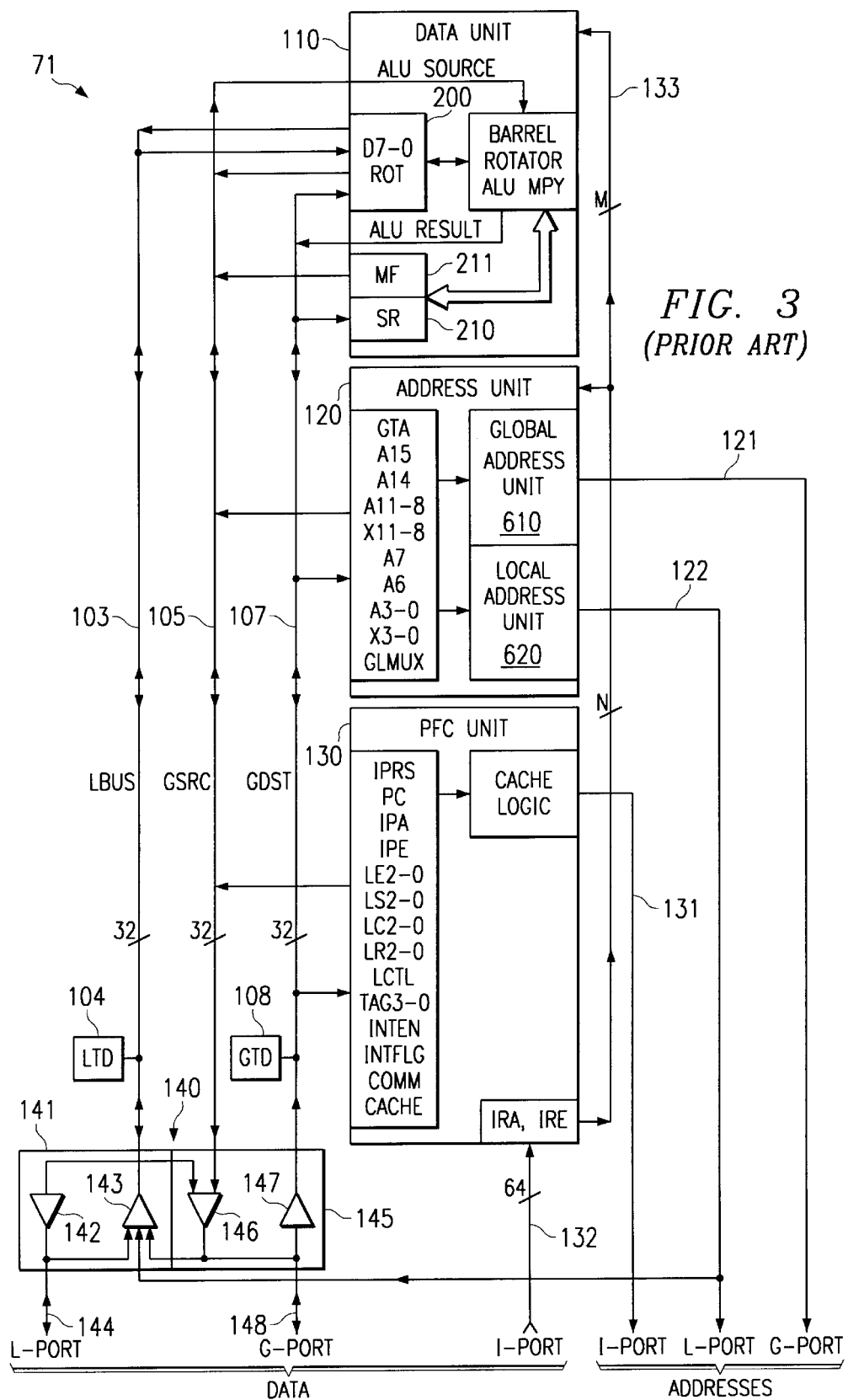
FIG. 3 illustrates in block diagram form one of the digital image/graphics processors illustrated in FIG. 2.

The four digital image/graphics processors 71, 72, 73 and 74 each have a highly parallel digital signal processor (DSP) architecture. FIG. 3 illustrates an overview of exemplary digital image/graphics processor 71, which is identical to digital image/graphics processors 72, 73 and 74. Digital image/graphics processor 71 achieves a high degree of parallelism of operation employing three separate units: data unit 110; address unit 120; and program flow control unit 130. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet requests. These linked list packet requests allow multidimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controlled 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width. This permits architecture flexibility by accommodating the addition or removal of digital image/graphics processors and corresponding memory modularly while maintaining the same pin out.

In the preferred embodiment all parts of multiprocessor integrated circuit 100 are disposed on a single integrated circuit. In the preferred embodiment, multiprocessor integrated circuit 100 is formed in complementary metal oxide semiconductor (CMOS) using feature sizes of 0.6 $\mu$m.

Multiprocessor integrated circuit 100 is preferably constructed in a pin grid array package having 256 pins. The inputs and outputs are preferably compatible with transistor-transistor logic (TTL) logic voltages. Multiprocessor integrated circuit 100 preferably includes about 3 million transistors and employs a clock rate of 50 MHZ.

FIG. 3 illustrates an overview of exemplary digital image/graphics processor 71, which is virtually identical to digital image/graphics processors 72, 73 and 74. Digital image/graphics processor 71 includes: data unit 110; address unit 120; and program flow control unit 130. Data unit 110 performs the logical or arithmetic data operations. Data unit 110 includes eight data registers D7–D0, a status register 210 and a multiple flags register 211. Address unit 120 controls generation of load/store addresses for the local data port and the global data port. As will be further described below, address unit 120 includes two virtually identical addressing units, one for local addressing and one for global addressing. Each of these addressing units includes an all "0" read only register enabling absolute addressing in a relative address mode, a stack pointer, five address registers and three index registers. The addressing units share a global bit multiplex control register used when forming a merging address from both address units. Program flow control unit 130 controls the program flow for the digital image/graphics processor 71 including generation of addresses for instruction fetch via the instruction port. Program flow control unit 130 includes; a program counter PC 701; an instruction pointer-address stage IRA 702 that holds the address of the instruction currently in the address pipeline stage; an instruction pointer-execute stage IRE 703 that holds the address of the instruction currently in the execute pipeline stage; an instruction pointer-return from subroutine IPRS 704 holding the address for returns from subroutines; a set of registers controlling zero overhead loops; four cache tag registers TAG3–TAG0 collectively called 708 that hold the most significant bits of four blocks of instruction words in the corresponding instruction cache memory.

Figure 4:
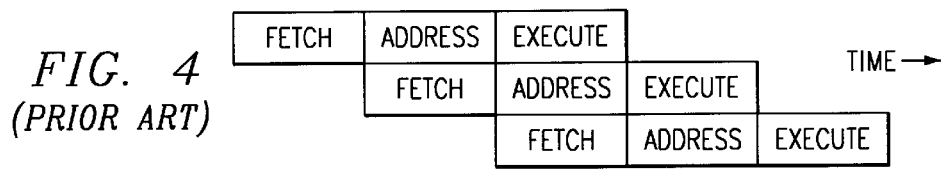
FIG. 4 illustrates in schematic form the pipeline stages of operation of the digital image/graphics processor illustrated in FIG. 2.

Digital image/graphics processor 71 operates on a three stage pipeline as illustrated in FIG. 4. Data unit 110, address unit 120 and program flow control unit 130 operate simultaneously on different instructions in an instruction pipeline. The three stages in chronological order are fetch, address and execute. Thus at any time, digital image/graphics processor 71 will be operating on differing functions of three instructions. The phrase pipeline stage is used instead of referring to clock cycles, to indicate that specific events occur when the pipeline advances, and not during stall conditions.

Program flow control unit 130 performs all the operations that occur during the fetch pipeline stage. Program flow control unit 130 includes a program counter, loop logic, interrupt logic and pipeline control logic. During the fetch pipeline stage, the next instruction word is fetched from memory. The address contained in the program counter is compared with cache tag registers to determine if the next instruction word is stored in instruction cache memory 21. Program flow control unit 130 supplies the address in the program counter to the instruction port address bus 131 to fetch this next instruction word from instruction cache memory 21 if present. Crossbar 50 transmits this address to the corresponding instruction cache, here instruction cache memory 21, which returns the instruction word on the instruction bus 132. Otherwise, a cache miss occurs and transfer controller 80 accesses external memory to obtain the next instruction word. The program counter is updated. If the following instruction word is at the next sequential, address, program control flow unit 130 post increments the program counter. Otherwise, program control flow unit 130 loads the address of the next instruction word according to the loop logic or software branch. If the synchronized MIMD mode is active, then the instruction fetch waits until all the specified digital image/graphics processors are synchronized, as indicated by sync bits in a communications register.

Address unit 120 performs all the address calculations of the address pipeline stage. Address unit 120 includes two independent address units, one for the global port and one for the local port. If the instruction calls for one or two memory accesses, then address unit 120 generates the address(es) during the address pipeline stage. The address(es) are supplied to crossbar 50 via the respective global port address bus 121 and local port address bus 122 for contention detection/prioritization. If there is no contention, then the accessed memory prepares to allow the requested access, but the memory access occurs during the following execute pipeline stage.

Data unit 110 performs all of the logical and arithmetic operations during the execute pipeline stage. All logical and arithmetic operations and all data movements to or from memory occur during the execute pipeline stage. The global data port and the local data port complete any memory accesses, which are begun during the address pipeline stage, during the execute pipeline stage. The global data port and the local data port perform all data alignment needed by memory stores, and any data extraction and sign extension needed by memory loads. If the program counter is specified as a data destination during any operation of the execute pipeline stage, then a delay of two instructions is experienced before any branch takes effect. The pipelined operation requires this delay, since the next two instructions following such a branch instruction have already been fetched. According to the practice in RISC processors, other useful instructions may be placed in the two delay slot positions.

Digital image/graphics processor 71 includes three internal 32 bit data busses. These are local port data bus Lbus 103, global port source data bus Gsrc 105 and global port destination data bus Gdst 107. These three buses interconnect data unit 110, address unit 120 and program flow control unit 130. These three buses are also connected to a data port unit 140 having a local port 141 and global port 145. Data port unit 140 is coupled to crossbar 50 providing memory access.

Local data port 141 has a buffer 142 for data stores to memory. A multiplexer/buffer circuit 143 loads data onto Lbus 103 from local port data bus 144 from memory via crossbar 50, from a local port address bus 122 or from global port data bus 148. Local port data bus Lbus 103 thus carries 32 bit data that is either register sourced (stores) or memory sourced (loads). Advantageously, arithmetic results in address unit 120 can be supplied via local port address bus 122, multiplexer buffer 143 to local port data bus Lbus 103 to supplement the arithmetic operations of data unit 110. This will be further described below. Buffer 142 and multiplexer buffer 143 perform alignment and extraction of data. Local port data bus Lbus 103 connects to data registers in data unit 110. A local bus temporary holding register LTD 104 is also connected to local port data Lbus 103.

Global port source data bus Gsrc 105 and global port destination data bus Gdst 107 mediate global data transfers. These global data transfers may be either memory accesses, register to register moves or command word transfers between processors. Global port source data bus Gsrc 105 carries 32 bit source information of a global port data transfer. The data source can be any of the registers of digital image/graphics processor 71 or any data or parameter memory corresponding to any of the digital image/graphics processors 71, 72, 73 or 74. The data is stored to memory via the global port 145. Multiplexer buffer 146 selects lines from local port data Lbus 103 or global port source data bus Gsrc 105, and performs data alignment. Multiplexer buffer 146 writes this data onto global port data bus 148 for application to memory via crossbar 50. Global port source data bus Gsrc 105 also supplies data to data unit 110, allowing the data of global port source data bus Gsrc 105 to be used as one of the arithmetic logic unit sources. This latter connection allows any register of digital image/graphics processor 71 to be a source for an arithmetic logic unit operation.

Global port destination data bus Gdst 107 carries 32 bit destination data of a global bus data transfer. The destination is any register of digital image/graphics processor 71. Buffer 147 in global port 145 sources the data of global port destination data bus Gdst 107. Buffer 147 performs any needed data extraction and sign extension operations. This buffer 115 operates if the data source is memory, and a load is thus being performed. The arithmetic logic unit result serves as an alternative data source for global port destination data bus Gdst 107. This allows any register of digital image/graphics processor 71 to be the destination of an arithmetic logic unit operation. A global bus temporary holding register GTD 108 is also connected to global port destination data bus Gdst 107.

Circuitry including multiplexer buffers 143 and 146 connect between global port source data bus Gsrc 105 and global port destination data bus Gdst 107 to provide register to register moves. This allows a read from any register of digital image/graphics processor 71 onto global port source data bus Gsrc 105 to be written to any register of digital image/graphics processor 71 via global port destination data bus Gdst 107.

Note that it is advantageously possible to perform a load of any register of digital image/graphics processor 71 from memory via global port destination data bus Gdst 107, while simultaneously sourcing the arithmetic logic unit in data unit 110 from any register via global port source data bus Gsrc 105. Similarly, it is advantageously possible to store the data in any register of digital image/graphics processor 71 to memory via global port source data bus Gsrc 105, while saving the result of an arithmetic logic unit operation to any register of digital image/graphics processor 71 via global port destination data bus Gdst 107. The usefulness of these data transfers will be further detailed below.

Program flow control unit 130 receives the instruction words fetched from instruction cache memory 21 via instruction bus 132. This fetched instruction word is advantageously stored in two 64 bit instruction registers designated instruction register-address stage IRA 751 and instruction register-execute stage IRE 752. Each of the instruction registers IRA and IRE have their contents decoded and distributed. Digital image/graphics processor 71 includes opcode bus 133 that carries decoded or partially decoded instruction contents to data unit 110 and address unit 120. As will be later described, an instruction word may include a 32 bit, a 15 bit or a 3 bit immediate field. Program flow control unit 130 routes such an immediate field to global port source data bus Gsrc 105 for supply to its destination.

Digital image/graphics processor 71 includes three address buses 121, 122 and 131. Address unit 120 generates addresses on global port address bus 121 and local port address bus 122. As will be further detailed below, address unit 120 includes separate global and local address units, which provide the addresses on global port address bus 121 and local port address bus 122, respectively. Note that local address unit 620 may access memory other than the data memory corresponding to that digital image/graphics processor. In that event the local address unit access is via global port address bus 121. Program flow control unit 130 sources the instruction address on instruction port address bus 131 from a combination of address bits from a program counter and cache control logic. These address buses 121, 122 and 131 each carry address, byte strobe and read/write information.

Figure 5:
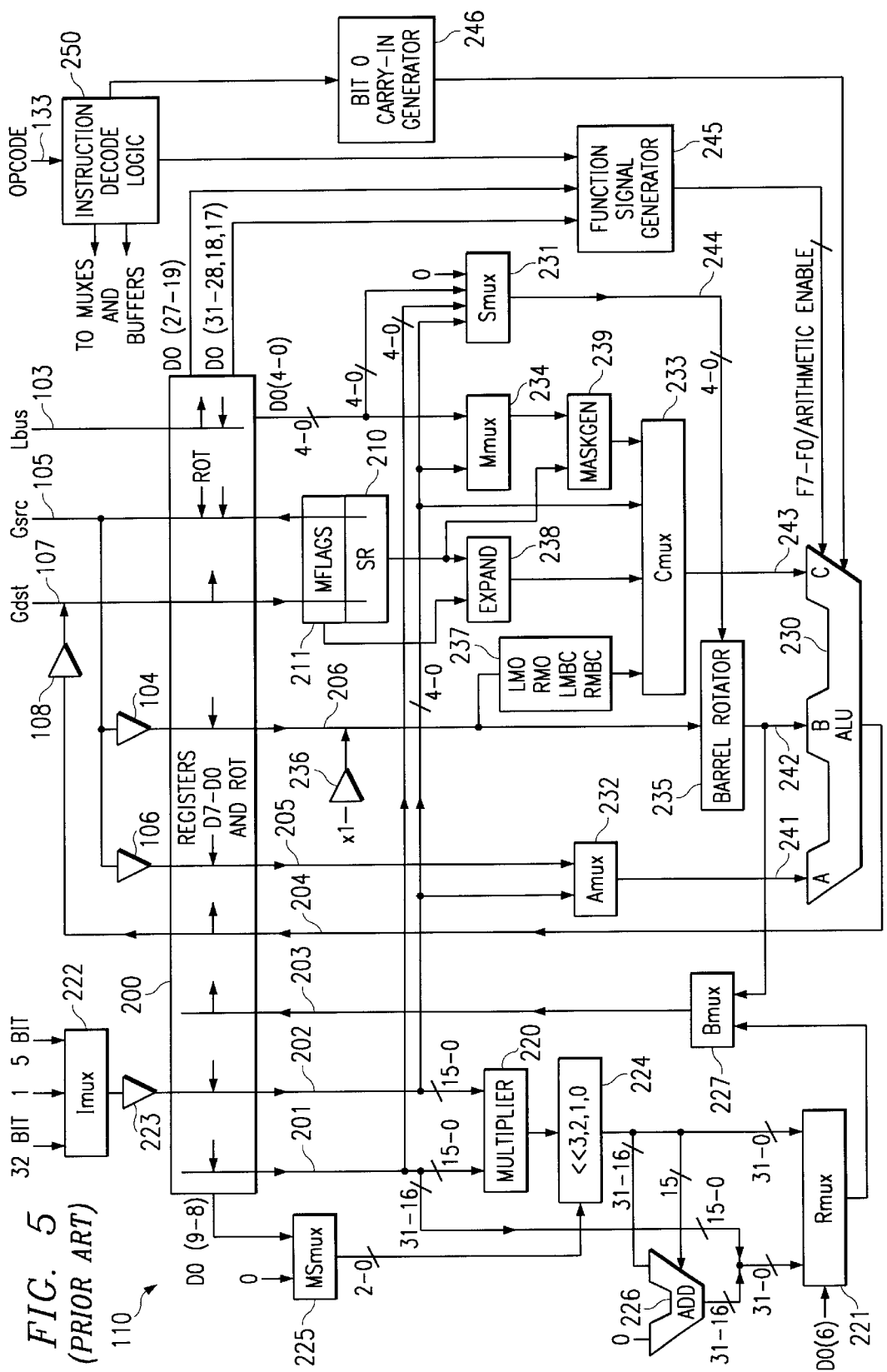
FIG. 5 illustrates in block diagram form the data unit of the digital image/graphics processors illustrated in FIG. 3.

FIG. 5 illustrates details of data unit 110. It should be understood that FIG. 5 does not illustrate all of the connections of data unit 110. In particular various control lines and the like have been omitted for the sake of clarity. Therefore FIG. 5 should be read with the following description for a complete understanding of the operation of data unit 110. Data unit 110 includes a number of parts advantageously operating in parallel. Data unit 110 includes eight 32 bit data registers 200 designated D7–D0. Data register D0 may be used as a general purpose register but in addition has special functions when used with certain instructions. Data registers 200 include multiple read and write ports connected to data unit buses 201 to 206 and to local port data bus Lbus 103, global port source data bus Gsrc 105 and global port destination data bus Gdst 107. Data registers 200 may also be read "sideways" in a manner described as a rotation register that will be further described below. Data unit 110 further includes a status register 210 and a multiple flags register 211, which stores arithmetic logic unit resultant status for use in certain instructions. Data unit 110 includes as its major computational components a hardware multiplier 220 and a three input arithmetic logic unit 230. Lastly, data unit 110 includes: multiplier first input bus 201, multiplier second input bus 202, multiplier destination bus 203, arithmetic logic unit destination bus 204, arithmetic logic unit first input bus 205, arithmetic logic unit second input bus 206; buffers 104, 106, 108 and 236; multiplexers Rmux 221, Imux 222, MSmux 225, Bmux 227, Amux 232, Smux 231, Cmux 233 and Mmux 234; and product left shifter 224, adder 226, barrel rotator 235, LMO/RMO/LMBC/RMBC circuit 237, expand circuit 238, mask generator 239, input A bus 241, input B bus 242, input C bus 243, rotate bus 244, function signal generator 245, bit 0 carry-in generator 246, and instruction decode logic 250, all of which will be further described below.

The following description of data unit 110 as well as further descriptions of the use of each digital image/graphics processor 71, 72, 73 and 74 employ several symbols for ease of expression. Many of these symbols are standard mathematical operations that need no explanation. Some are logical operations that will be familiar to one skilled in the art, but whose symbols may be unfamiliar. Lastly, some symbols refer to operations unique to this invention. Table 1 lists some of these symbols and their corresponding operation.

TABLE 1

| Symbol | Operation |
|--------|-----------|
| ~ | bit wise NOT |
| & | bit wise AND |

TABLE 1-continued

| Symbol | Operation |
|---|---|
| 3 | bit wise OR |
| ^ | bit wise exclusive OR |
| % | mask generation |
| %! | modified mask generation |
| >> | shift right |
| o | parallel operation |

The implications of the operations listed above in Table 1 may not be immediately apparent. These will be explained in detail below.

Figure 6:
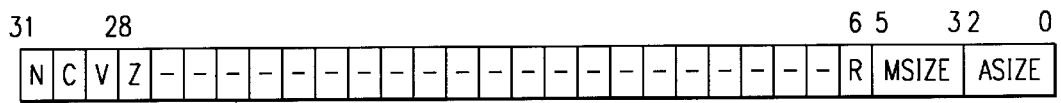
FIG. 6 illustrates in schematic form field definitions of the status register of the data unit illustrated in FIG. 5.

FIG. 6 illustrates the field definitions for status register 210. Status register 210 may be read from via global port source data bus Gsrc 105 or written into via global port destination data bus Gdst bus 107. In addition, status register 210 may write to or load from a specified one of data registers 200. Status register 210 is employed in control of operations within data unit 110.

Status register 210 stores four arithmetic logic unit result status bits "N", "C", "V" and "Z". These are individually described below, but collectively their setting behavior is as follows. Note that the instruction types listed here will be fully described below. For instruction words including a 32 bit immediate fields, if the condition code field is "unconditional" then all four status bits are set according to the result of arithmetic logic unit 230. If the condition code field specifies a condition other than "unconditional", then no status bits are set, whether or not the condition is true. For instruction words not including a 32 bit immediate field operations and not including conditional operations fields, all status bits are set according to the result of arithmetic logic unit 230. For instruction words not including a 32 bit immediate field that permit conditional operations, if the condition field is "unconditional", or not "unconditional" and the condition is true, instruction word bits 28-25 indicate which status bits should be protected. All unprotected bits are set according to the result of arithmetic logic unit 230. For instruction words not including a 32 bit immediate field, which allow conditional operations, if the condition field is not "unconditional" and the condition is false, no status bits are set. There is no difference in the status setting behavior for Boolean operations and arithmetic operations. As will be further explained below, this behavior, allows the conditional instructions and source selection to perform operations that would normally require a branch.

The arithmetic logic unit result bits of status register 210 are as follows. The "N" bit (bit 31) stores an indication of a negative result. The "N" bit is set to "1" if the result of the last operation of arithmetic logic unit 230 was negative. This bit is loaded with bit 31 of the result. In a multiple arithmetic logic unit operation, which will be explained below, the "N" bit is set to the AND of the zero compares of the plural sections of arithmetic logic unit 230. In a bit detection operation performed by LMO/RMO/LMBC/RMBC circuit 237, the "N" bit is set to the AND of the zero compares of the plural sections of arithmetic logic unit 230. Writing to this bit in software overrides the normal arithmetic logic unit result writing logic.

The "C" bit (bit 30) stores an indication of a carry result. The "C" bit is set to "1" if the result of the last operation of arithmetic logic unit 230 caused a carry-out from bit 31 of the arithmetic logic unit. During multiple arithmetic and bit detection, the "C" bit is set to the OR of the carry outs of the plural sections of arithmetic logic unit 230. Thus the "C" bit is set to "1" if at least one of the sections has a carry out. Writing to this bit in software overrides the normal arithmetic logic unit result writing logic.

The "V" bit (bit 29) stores an indication of an overflow result. The "V" bit is set to "1" if the result of the last operation of arithmetic logic unit 230 created an overflow condition. This bit is loaded with the exclusive OR of the carry-in and carry-out of bit 31 of the arithmetic logic unit 230. During multiple arithmetic logic unit operation the "V" bit is the AND of the carry outs of the plural sections of arithmetic logic unit 230. For left most one and right most one bit detection, the "V" bit is set to "1" if there were no "1's" in the input word, otherwise the "V" bit is set to "0". For left most bit change and right most bit change bit detection, the "V" bit is set to "1" is all the bits of the input are the same, or else the "V" bit is set to "0". Writing to this bit in software overrides the normal arithmetic logic unit result writing logic.

The "Z" bit (bit 28) stores and indication of a "0" result. The "Z" bit is set to "1" if the result of the last operation of arithmetic logic unit 230 produces a "0" result. This "Z" bit is controlled for both arithmetic operations and logical operations. In multiple arithmetic and bit detection operations, the "Z" bit is set to the OR of the zero compares of the plural sections of arithmetic logic unit 230. Writing to this bit in software overrides the normal arithmetic logic unit result writing logic circuitry.

The "R" bit (bit 6) controls bits used by expand circuit 238 and rotation of multiple flags register 211 during instructions that use expand circuit 238 to expand portions of multiple flags register 211. If the "R" bit is "1", then the bits used in an expansion of multiple flags register 211 via expand circuit 238 are the most significant bits. For an operation involving expansion of multiple flags register 211 where the arithmetic logic unit function modifier does not specify multiple flags register rotation, then multiple flags register 211 is "post-rotated left" according to the "Msize" field. If the arithmetic logic unit function modifier does specify multiple flags register rotation, then multiple flags register 211 is rotated according to the "Asize" field. If the "R" bit is "0", then expand circuit 238 employs the least significant bits of multiple flags register 211. No rotation takes place according to the "Msize" field. However, the arithmetic logic unit function modifier may specify rotation by the "Asize" field.

The "Msize" field (bits 5-3) indicates the data size employed in certain instruction classes that supply mask data from multiple flags register 211 to the C-port of arithmetic logic unit 230. The "Msize" field determines how many bits of multiple flags register 211 uses to create the mask information. When the instruction does not specify rotation corresponding to the "Asize" field and the "R" bit is "1", then multiple flags register 211 is automatically "post-rotated left" by an amount set by the "Msize" field. Codings for these bits are shown in Table 2.

TABLE 2

| Msize Field | Data Size | Multiple Flags Register | | | |
|---|---|---|---|---|---|
| | | Rotate | No. of | Bit(s) used | |
| 5 4 3 | bits | Amount | bits used | R = 1 | R = 0 |
| 0 0 0 | 0 | 64 | 64 | — | — |
| 0 0 1 | 1 | 32 | 32 | 31-0 | 31-0 |
| 0 1 0 | 2 | 16 | 16 | 31-16 | 15-0 |
| 0 1 1 | 4 | 8 | 8 | 31-24 | 7-0 |
| 1 0 0 | 8 | 4 | 4 | 31-28 | 3-0 |

TABLE 2-continued

| Msize Field 5 4 3 | Data Size bits | Multiple Flags Register | | | |
|---|---|---|---|---|---|
| | | Rotate Amount | No. of bits used | Bit(s) used R = 1 | R = 0 |
| 1 0 1 | 16 | 2 | 2 | 31-20 | 2-1 |
| 1 1 0 | 32 | 1 | 1 | 31 | 0 |
| 1 1 1 | 64 | 0 | 0 | — | — |

As noted above, the preferred embodiment supports "Msize" fields of "100", "101" and "110" corresponding to data sizes of 8, 16 and 32 bits, respectively. Note that rotation for an "Msize" field of "001" results in no change in data output. "Msize" fields of "001", "010" and "011" are possible useful alternatives. "Msize" fields of "000" and "111" are meaningless but may be used in an extension of multiple flags register 211 to 64 bits.

The "Asize" field (bits 2–0) indicate the data size for multiple operations performed by arithmetic logic unit 230. Arithmetic logic unit 230 preferably includes 32 parallel bits. During certain instructions arithmetic logic unit 230 splits into multiple independent sections. This is called a multiple arithmetic logic unit operation. This splitting of arithmetic logic unit 230 permits parallel operation on pixels of less than 32 bits that are packed into 32 bit data words. In the preferred embodiment arithmetic logic unit 230 supports: a single 32 bit operation; two sections of 16 bit operations; and four sections of 8 bit operations. These options are called word, half-word and byte operations.

The "Asize" field indicates: the number of multiple sections of arithmetic logic unit 230; the number of bits of multiple flags register bits 211 set during the arithmetic logic unit operation, which is equal in number to the number of sections of arithmetic logic unit 230; and the number of bits the multiple flags register should "post-rotate left" after output during multiple arithmetic logic unit operation. The rotation amount specified by the "Asize" field dominates over the rotation amount specified by the "Msize" field and the "R" bit when the arithmetic logic unit function modifier indicates multiple arithmetic with rotation. Codings for these bits are shown in Table 3. Note that while the current preferred embodiment of the invention supports multiple arithmetic of one 32 bit section, two 16 bit sections and four 8 bit sections the coding of the "Asize" field supports specification of eight sections of 4 bits each, sixteen sections of 2 bits each and thirty-two sections of 1 bit each. Each of these additional section divisions of arithmetic logic unit 230 are feasible. Note also that the coding of the "Asize" field further supports specification of a 64 bit data size for possible extension of multiple flags register 211 to 64 bits.

TABLE 3

| Asize Field 2 1 0 | Data Size bits | Multiple Flags Register | | |
|---|---|---|---|---|
| | | Rotate Amount | No. of bits used | Bit(s) used |
| 0 0 0 | 0 | 64 | 64 | — |
| 0 0 1 | 1 | 32 | 32 | 31-0 |
| 0 1 0 | 2 | 16 | 16 | 15-0 |
| 0 1 1 | 4 | 8 | 8 | 7-0 |
| 1 0 0 | 8 | 4 | 4 | 3-0 |
| 1 0 1 | 16 | 2 | 2 | 1-0 |
| 1 1 0 | 32 | 1 | 1 | 0 |
| 1 1 1 | 64 | 0 | 0 | — |

The "Msize" and "Asize" fields of status register 210 control different operations. When using the multiple flags register 211 as a source for producing a mask applied to the C-port of arithmetic logic unit 230, the "Msize" field controls the number of bits used and the rotate amount. In such a case the "R" bit determines whether the most significant bits or least significant bits are employed. When using the multiple flags register 211 as a destination for the status bits corresponding to sections of arithmetic logic unit 230, then the "Asize" field controls the number and identity of the bits loaded and the optional rotate amount. If a multiple arithmetic logic unit operation with "Asize" field specified rotation is specified with an instruction that supplies mask data to the C-port derived from multiple flags register 211, then the rotate amount of the "Asize" field dominates over the rotate amount of the combination of the "R" bit and the "Msize" field.

The multiple flags register 211 is a 32 bit register that provides mask information to the C-port of arithmetic logic unit 230 for certain instructions. Global port destination data bus Gdst bus 107 may write to multiple flags register 211. Global port source bus Gsrc may read data from multiple flags register 211. In addition multiple arithmetic logic unit operations may write to multiple flags register 211. In this case multiple flags register 211 records either the carry or zero status information of the independent sections of arithmetic logic unit 230. The instruction executed controls whether the carry or zero is stored.

The "Msize" field of status register 210 controls the number of least significant bits used from multiple flags register 211. This number is given in Table 2 above. The "R" bit of status register 210 controls whether multiple flags register 211 is pre-rotated left prior to supply of these bits. The value of the "Msize" field determines the amount of rotation if the "R" bit is "1". The selected data supplies expand circuit 238, which generates a 32 bit mask as detailed below.

The "Asize" field of status register 210 controls the data stored in multiple flags register 211 during multiple arithmetic logic unit operations. As previously described, in the preferred embodiment arithmetic logic unit 230 may be used in one, two or four separate sections employing data of 32 bits, 16 bits and 8 bits, respectively. Upon execution of a multiple arithmetic logic unit operation, the "Asize" field indicates through the defined data size the number of bits of multiple flags register 211 used to record the status information of each separate result of the arithmetic logic unit. The bit setting of multiple flags register 211 is summarized in Table 4.

TABLE 4

| Data Size | ALU carry-out bits setting MF bits | | | | ALU result bits equal to zero setting MF bits | | | |
|---|---|---|---|---|---|---|---|---|
| Bits | 3 | 2 | 1 | 0 | 3 | 2 | 1 | 0 |
| 8 | 31 | 23 | 15 | 7 | 31-24 | 23-16 | 15-8 | 7-0 |
| 16 | — | — | 31 | 15 | — | — | 31-16 | 15-0 |
| 32 | — | — | — | 31 | — | — | — | 31-0 |

Note that Table 4 covers only the cases for data sizes of 8, 16 and 32 bits. Those skilled in the art would easily realize how to extend Table 4 to cover the cases of data sizes of 64 bits, 4 bits, 2 bits and 1 bit. Also note that the previous discussion referred to storing either carry or zero status in multiple flags register 211. It is also feasible to store other status bits such as negative and overflow.

Multiple flags register 211 may be rotated left a number of bit positions upon execution of each arithmetic logic unit operation. The rotate amount is given above. When performing multiple arithmetic logic unit operations, the result status bit setting dominates over the rotate for those bits that are being set. When performing multiple arithmetic logic unit operations, an alternative to rotation is to clear all the bits of multiple flags register 211 not being set by the result status. This clearing is after generation of the mask data if mask data is used in that instruction. If multiple flags register 211 is written by software at the same time as recording an arithmetic logic unit result, then the preferred operation is for the software write to load all the bits. Software writes thus dominate over rotation and clearing of multiple flags register 211.

Figure 7:
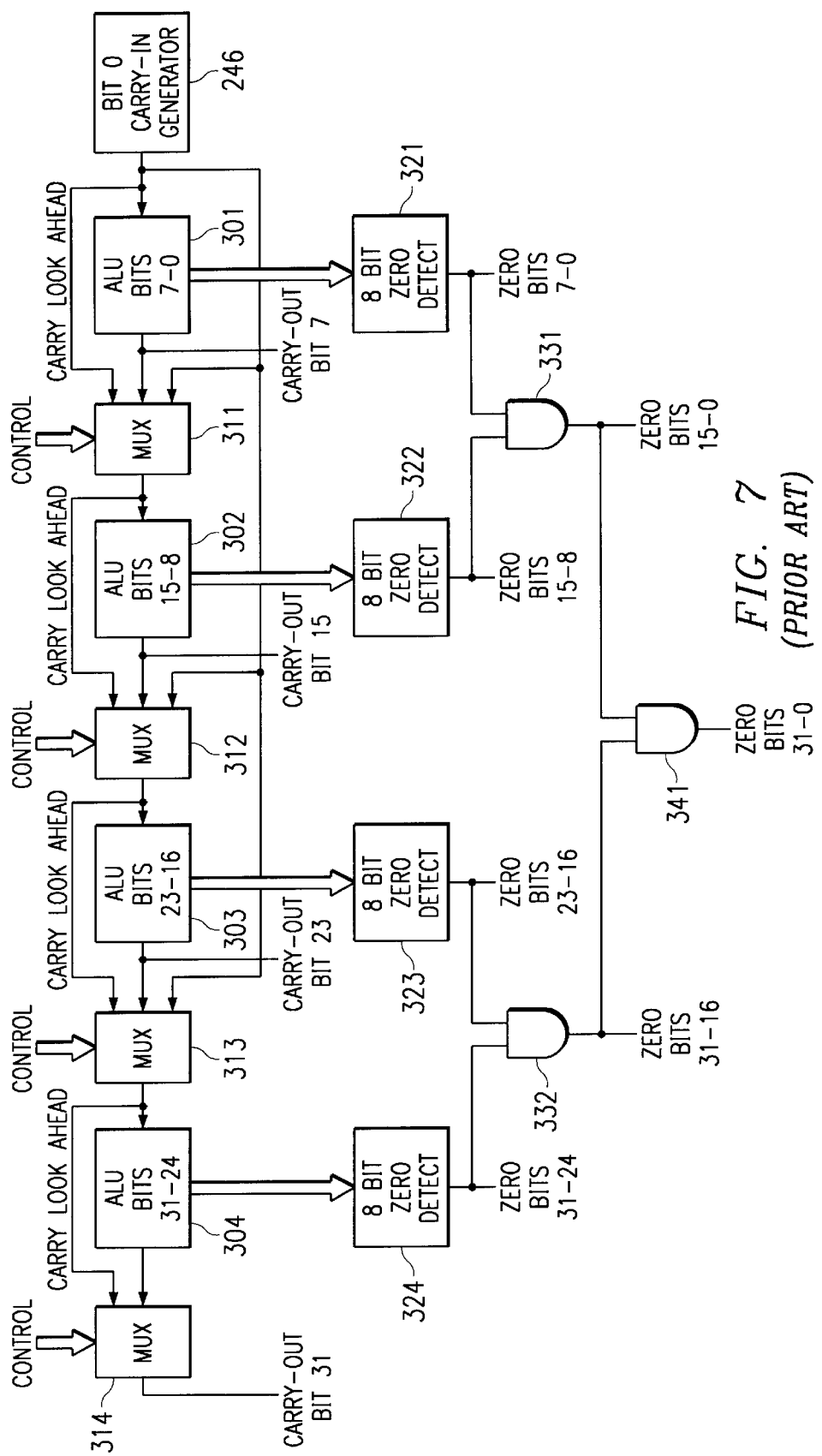
FIG. 7 illustrates in block diagram form the manner of splitting the arithmetic logic unit of the data unit illustrated in FIG. 5.

FIG. 7 illustrates the splitting of arithmetic logic unit 230 into multiple sections. As illustrated in FIG. 7, the 32 bits of arithmetic logic unit 230 are separated into four sections of eight bits each. Section 301 includes arithmetic logic unit bits 7–0, section 302 includes bits 15–8, section 303 includes bits 23–16 and section 304 includes bits 31–24. Note that FIG. 7 does not illustrate the inputs or outputs of these sections, which are conventional, for the sake of clarity. The carry paths within each of the sections 301, 302, 303 and 303 are according to the known art.

Multiplexers 311, 312 and 313 control the carry path between sections 301, 302, 303 and 304. Each of these multiplexers is controlled to select one of three inputs. The first input is a carry look ahead path from the output of the previous multiplexer, or in the case of the first multiplexer 311 from bit 0 carry-in generator 246. Such carry look ahead paths and their use are known in the art and will not be further described here. The second selection is the carry-out from the last bit of the corresponding section of arithmetic logic unit 230. The final selection is the carry-in signal from bit 0 carry-in generator 246. Multiplexer 314 controls the output carry path for arithmetic logic unit 230. Multiplexer 314 selects either the carry look ahead path from the carry-out selected by multiplexer 313 or the carry-out signal for bit 31 from section 304.

Multiplexers 311, 312, 313 and 314 are controlled based upon the selected data size. In the normal case arithmetic logic unit 230 operates on 32 bit data words. This is indicated by an "Asize" field of status register 210 equal to "110". In this case multiplexer 311 selects the carry-out from bit 7, multiplexer 312 selects the carry-out from bit 15, multiplexer 313 selects the carry-out from bit 23 and multiplexer 314 selects the carry-out from bit 31. Thus the four sections 301, 302, 303 and 304 are connected together into a single 32 bit arithmetic logic unit. If status register 210 selected a half-word via an "Asize" field of "101", then multiplexer 311 selects the carry-out from bit 7, multiplexer 312 selects the carry-in from bit 0 carry-in generator 246, multiplexer 313 selects the carry-out from bit 23 and multiplexer 314 selects the carry-in from bit 0 carry-in generator 246. Sections 301 and 302 are connected into a 16 bit unit and sections 303 and 304 are connected into a 16 bit unit. Note that multiplexer 312 selects the bit 0 carry-in signal for bit 16 just like bit 0, because bit 16 is the first bit in a 16 bit half-word. If status register 210 selected a byte via an "Asize" field of "100", then multiplexers 311, 312 and 313, select the carry-in from bit 0 carry-in generator 246. Sections 301, 302, 303 and 304 are split into four independent 8 bit units. Note that selection of the bit 0 carry-in signal at each multiplexer is proper because bits 8, 16 and 24 are each the first bit in an 8 bit byte.

FIG. 7 further illustrates zero resultant detection. Each 8 bit zero detect circuit 321, 322, 323 and 324 generates a "1" output if the resultant from the corresponding 8 bit section is all zeros "00000000". AND gate 331 is connected to 8 bit zero detect circuits 321 and 322, thus generating a "1" when all sixteen bits 15–0 are "0". AND gate 332 is similarly connected to 8 bit zero detect circuits 321 and 322 for generating a "1" when all sixteen bits 31–16 are "0". Lastly, AND gate 341 is connected to AND gates 331 and 332, and generates a "1" when all 32 bits 31–0 are "0".

During multiple arithmetic logic unit operations multiple flags register 211 may store either carry-outs or the zero comparison, depending on the instruction. These stored resultants control masks to the C-port during later operations. Table 4 shows the source for the status bits stored. In the case in which multiple flags register 211 stores the carry-out signal(s), the "Asize" field of status register 210 determines the identity and number of carry-out signals stored. If the "Asize" field specifies word operations, then multiple flags register 211 stores a single bit equal to the carry-out signal of bit 31. If the "Asize" field specifies half-word operations, then multiple flags register 211 stores two bits equal to the carry-out signals of bits 31 and 15, respectfully. If the "Asize" field specifies byte operations, then multiple flags register 211 stores four bits equal to the carry-out signals of bits 31, 23, 15 and 7, respectively. The "Asize" field similarly controls the number and identity of zero resultants stored in multiple flags register 211 when storage of zero resultants is selected. If the "Asize" field specifies word operations, then multiple flags register 211 stores a single bit equal to output of AND gate 341 indicating if bits 31–0 are "0". If the "Asize" field specifies half-word operations, then multiple flags register 211 stores two bits equal to the outputs of AND gates 331 and 332, respectfully. If the "Asize" field specifies byte operations, then multiple flags register 211 stores four bits equal to the outputs of 8 bit zero detect circuits 321, 322, 323 and 324, respectively.

It is technically feasible and within the scope of this invention to allow further multiple operations of arithmetic logic unit 230 such as: eight sections of 4 bit operations; sixteen sections 2 bit operations; and thirty-two sections single bit operations. Note that both the "Msize" and the "Asize" fields of status register 210 include coding to support such additional multiple operation types. Those skilled in the art can easily modify and extend the circuits illustrated in FIG. 7 using additional multiplexers and AND gates. These latter feasible options are not supported in the preferred embodiment due to the added complexity in construction of arithmetic logic unit 230. Note also that this technique can be extended to a data processing apparatus employing 64 bit data and that the same teachings enable such an extension.

Data registers 200, designated data registers D7–D0 are connected to local port data bus Lbus 103, global port source data bus Gsrc 105 and global port destination data bus Gdst 107. Arrows within the rectangle representing data registers 200 indicate the directions of data access. A left pointing arrow indicates data recalled from data registers 200. A right pointing arrow indicates data written into data registers 200. Local port data bus Lbus 103 is bidirectionally coupled to data registers 200 as a data source or data destination. Global port destination data bus Gdst 107 is connected to data registers 200 as a data source for data written into data registers 200. Global port source data bus Gsrc 107 is connected to data registers 200 as a data destination for data recalled from data registers 200 in both a normal data register mode and in a rotation register feature described below. Status register 210 and multiple flags register 211 may be read from via global port source data bus Gsrc 106 and written into via global port destination data bus Gdst 107. Data registers 200 supply data to multiplier first input bus 201, multiplier second input bus 202, arithmetic logic unit first input bus 205 and arithmetic logic unit second input bus 206. Data registers 200 are connected to receive input data from multiplier destination bus 203 and arithmetic logic unit destination bus 204.

Figure 8:
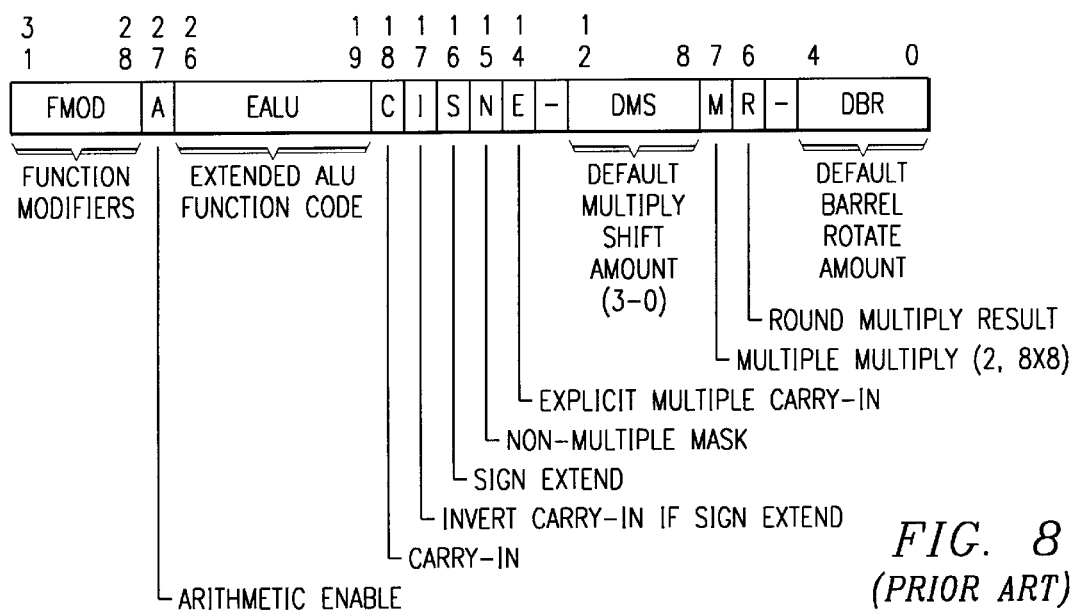
FIG. 8 illustrates in schematic form the field definitions of the first data register of the data unit illustrated in FIG. 5.

The data register D0 has a dual function. It may be used as a normal data register in the same manner as the other data registers D7–D1. Data register D0 may also define certain special functions when executing some instructions. Some of the bits of the most significant half-word of data register D0 specifies the operation of all types of extended arithmetic logic unit operations. Some of the bits of the least significant half-word of data register D0 specifies multiplier options during a multiple multiply operation. The 5 least significant bits of data register D0 specify a default barrel rotate amount used by certain instruction classes. FIG. 8 illustrates the contents of data register D0 when specifying data unit 110 operation.

The "FMOD" field (bits 31–28) of data register D0 allow modification of the basic operation of arithmetic logic unit 230 when executing an instruction calling for an extended arithmetic logic unit (EALU) operation. Table 5 illustrates these modifier options. Note, as indicated in Table 5, certain instruction word bits in some instruction formats are decoded as function modifiers in the same fashion. These will be further discussed below.

The "FMOD" field (bits 31–28) of data register D0 allow modification of the basic operation of arithmetic logic unit 230 when executing an instruction calling for an extended arithmetic logic unit (EALU) operation. Table 5 illustrates these modifier options. Note certain instruction word bits in some instruction formats are decoded as function modifiers in the same fashion. The four function modifier bits are mapped to data register D0 bits 28, 29, 30 and 31 and are also mapped to respective instruction word bits 52, 54, 56 and 58 in certain instructions.

TABLE 5

| Function Modifier Code | Modification Performed |
| --- | --- |
| 0 0 0 0 | normal operation |
| 0 0 0 1 | normal operation |
| 0 0 1 0 | %! if mask generation instruction LMO if not mask generation instruction |
| 0 0 1 1 | (%! and cin) if mask generation instruction RMO if not mask generation instruction |
| 0 1 0 0 | A-port = 0 |
| 0 1 0 1 | A-port = 0 and cin |
| 0 1 1 0 | (A-port = 0 and %!) if mask generation instruction LMBC if not mask generation instruction |
| 0 1 1 1 | (A-port = 0 and %! and cin) if mask generation instruction RMBC if not mask generation instruction |
| 1 0 0 0 | Multiple arithmetic logic unit operations, carry-out(s) --> multiple flags register |
| 1 0 0 1 | Multiple arithmetic logic unit operations, zero result(s) --> multiple flags register |
| 1 0 1 0 | Multiple arithmetic logic unit operations, carry-out(s) --> multiple flags register, rotate by Asize field of status register |
| 1 0 1 1 | Multiple arithmetic logic unit operations, zero result(s) --> multiple flags register, rotate by "Asize" field of status register |
| 1 1 0 0 | Multiple arithmetic logic unit operations, carry-out(s) --> multiple flags register, clear multiple flags register |
| 1 1 0 1 | Multiple arithmetic logic unit operations, zero result(s) --> multiple flags register, clear multiple flags register |
| 1 1 1 0 | Reserved |
| 1 1 1 1 | Reserved |

The modified operations listed in Table 5 are explained below. If the "FMOD" field is "0000", the normal, unmodified operation results. The modification "cin" causes the carry-in to bit 0 of arithmetic logic unit 230 to be the "C" bit of status register 210. This allows add with carry, subtract with borrow and negate with borrow operations. The modification "%!" works with mask generation. When the "%!" modification is active mask generator 239 effectively generates all "1's" for a zero rotate amount rather than all "0's". This function can be implemented by changing the mask generated by mask generator 239 or by modifying the function of arithmetic logic unit 230 so that mask of all "0's" supplied to the C-port operates as if all "1's" were supplied. This modification is useful in some rotate operations. The modifications "LMO", "RMO", "LMBC" and "RMBC" designate controls of the LMO/RMO/LMBC/RMBC circuit 237. The modification "LMO" finds the left most "1" of the second arithmetic input. The modification "RMO" finds the right most "1". The modification "LMBC" finds the left most bit that differs from the sign bit (bit 31). The "RMBC" modification finds the right most bit that differs from the first bit (bit 0). Note that these modifications are only relevant if the C-port of arithmetic logic unit 230 does not receive a mask from mask generator 239. The modification "A-port= 0" indicates that the input to the A-port of arithmetic logic unit 230 is effectively zeroed. This may take place via multiplexer Amux 232 providing a zero output, or the operation of arithmetic logic unit 230 may be altered in a manner having the same effect. An "A-port=0" modification is used in certain negation, absolute-value and shift right operations. A "multiple arithmetic logic unit operation" modification indicates that one or more of the carry paths of arithmetic logic unit 230 are severed, forming in effect one or more independent arithmetic logic units operating in parallel. The "Asize" field of status register 210 controls the number of such multiple arithmetic logic unit sections. The multiple flags register 211 stores a number of status bits equal to the number of sections of the multiple arithmetic logic unit operations. In the "carry-out(s)→multiple flags" modification, the carry-out bit or bits are stored in multiple flags register 211. In the "zero result(s)→multiple flags" modification, an indication of the zero resultant for the corresponding arithmetic logic unit section is stored in multiple flags register 211. This process is described above together with the description of multiple flags register 211. During this storing operation, bits within multiple flags register 211 may be rotated in response to the "rotate" modification or cleared in response to the "clear" modification. These options are discussed above together with the description of multiple flags register 211.

The "A" bit (bit 27) of data register D0 controls whether arithmetic logic unit 230 performs an arithmetic or Boolean logic operation during an extended arithmetic logic unit operation. This bit is called the arithmetic enable bit. If the "A" bit is "1", then an arithmetic operation is performed. If the "A" bit is "0", then a logic operation is performed. If the "A" bit is "0", then the carry-in from bit 0 carry-in generator 246 into bit 0 of the arithmetic logic unit 230 is generally "0". As will be further explained below, certain extended arithmetic logic unit operations may have a carry-in bit of "0" even when the "A" bit is "0" indicating a logic operation.

The "EALU" field (bits 19–26) of data register D0 defines an extended arithmetic logic unit operation. The eight bits of the "EALU" field specify the arithmetic logic unit function control bits used in all types of extended arithmetic logic unit operations. These bits become the control signals to arithmetic logic unit 230. They may be passed to arithmetic logic unit 230 directly, or modified according to the "FMOD" field. In some instructions the bits of the "EALU"

field are inverted, leading to an "EALUF" or extended arithmetic logic unit false operation. In this case the eight control bits supplied to arithmetic logic unit 230 are inverted.

The "C" bit (bit 18) of data register D0 designates the carry-in to bit 0 of arithmetic logic unit 230 during extended arithmetic logic unit operations. The carry-in value into bit 0 of the arithmetic logic unit during extended arithmetic logic unit operations is given by this "C" bit. This allows the carry-in value to be specified directly, rather than by a formula as for non-EALU operations.

The "I" bit (bit 17) of data register D0 is designated the invert carry-in bit. The "I" bit, together with the "C" bit and the "S" bit (defined below), determines whether or not to invert the carry-in into bit 0 of arithmetic logic unit 230 when the function code of an arithmetic logic unit operation are inverted. This will be further detailed below.

The "S" bit (bit 16) of data register D0 indicates selection of sign extend. The "S" bit is used when executing extended arithmetic logic unit operations ("A" bit=1). If the "S" bit is "1", then arithmetic logic unit control signals F3–F0 (produced from bits 22–19) should be inverted if the sign bit (bit 31) of the data first arithmetic logic unit input bus 206 is "0", and not inverted if this sign bit is "1". The effect of conditionally inverting arithmetic logic unit control signals F3–F0 will be explained below. Such an inversion is useful to sign extend a rotated input in certain arithmetic operations. If the extended arithmetic logic unit operation is Boolean ("A" bit=0), then the "S" bit is ignored and the arithmetic logic unit control signals F3–F0 are unchanged.

Table 6 illustrates the interaction of the "C", "I" and "S" bits of data register D0. Note that an "X" entry for either the "I" bit or the first input sign indicates that bit does not control the outcome, i.e. a "don't care" condition.

TABLE 6

| S | I | First Input Sign | Invert C? | Invert F3-F0 |
|---|---|---|---|---|
| 0 | X | X | No | No |
| 1 | 0 | 0 | No | No |
| 1 | 0 | 1 | No | Yes |
| 1 | 1 | 0 | No | No |
| 1 | 1 | 1 | Yes | Yes |

If the "S" bit equals "1" and the sign bit of the first input destined for the B-port of arithmetic logic unit 230 equals "0", then the value of the carry-in to bit 0 of arithmetic logic unit 230 set by the "C" bit value can optionally be inverted according to the value of the "I" bit. This allows the carry-in to be optionally inverted or not, based on the sign of the input. Note also that arithmetic logic unit control signals F3–F0 are optionally inverted based on the sign of the input, if the "S" bit is "1". This selection of inversion of arithmetic logic unit control signals F3–F0 may be overridden by the "FMOD" field. If the "FMOD" field specifies "Carry-in= Status Register's Carry bit", then the carry-in equals the "C" bit of status register 210 whatever the value of the "S" and "I" bits. Note also that the carry-in for bit 0 of arithmetic logic unit 230 may be set to "1" via the "C" bit for extended arithmetic logic unit operations even if the "A" bit is "0" indicating a Boolean operation.

The "N" bit (bit 15) of data register D0 is used when executing a split or multiple section arithmetic logic unit operation. This "N" bit is called the non-multiple mask bit. For some extended arithmetic logic unit operations that specify multiple operation via the "FMOD" field, the instruction specifies a mask to be passed to the C-port of arithmetic logic unit 230 via mask generator 239. This "N" bit determines whether or not the mask is split into the same number of sections as arithmetic logic unit 230. Recall that the number of such multiple sections is set by the "Asize" field of status register 210. If the "N" bit is "0", then the mask is split into multiple masks. If the "N" bit is "1", then mask generator 239 produces a single 32 bit mask.

The "E" bit (bit 14) designates an explicit multiple carry-in. This bit permits the carry-in to be specified at run time by the input to the C-port of arithmetic logic unit 230. If both the "A" bit and the "E" bit are "1" and the "FMOD" field does not designate the cin function, then the effects of the "S", "I" and "C" bits are annulled. The carry input to each section during multiple arithmetic is taken as the exclusive OR of the least significant bit of the corresponding section input to the C-port and the function signal F0. If multiple arithmetic is not selected the single carry-in to bit 0 of arithmetic logic unit 230 is the exclusive OR of the least significant bit (bit 0) the input to the C-port and the function signal F0. This is particularly useful for performing multiple arithmetic in which differing functions are performed in different sections. One extended arithmetic logic unit operation corresponds to $(A\wedge B)\&C^3$ $(A\wedge \sim B)\&C$. Using a mask for the C-port input, a section with all "0's" produces addition with the proper carry-in of "0" and a section of all "1's" produces subtraction with the proper carry-in of "1".

The "DMS" field (bits 12–8) of data register D0 defines the shift following the multiplier. This shift takes place in product left shifter 224 prior to saving the result or passing the result to rounding logic. During this left shift the most significant bits shifted out are discarded and zeroes are shifted into the least significant bits. The "DMS" field is effective during any multiply/extended arithmetic logic unit operation. In the preferred embodiment data register D0 bits 9–8 select 0, 1, 2 or 3place left shifting. Table 7 illustrates the decoding.

TABLE 7

| DMS Field | | |
|---|---|---|
| 9 | 8 | Left Shift Amount |
| 0 | 0 | 0 |
| 0 | 1 | 1 |
| 1 | 0 | 2 |
| 1 | 1 | 3 |

The "DMS" field includes 5 bits that can designate left shift amounts from 0 to 31 places. In the preferred embodiment product left shifter 224 is limited to shifts from 0 to 3 places for reasons of size and complexity. Thus bits 12–10 of data register D0 are ignored in setting the left shift amount. However, it is feasible to provide a left shift amount within the full range from 0 to 31 places from the "DMS" field if desired.

The "M" bit (bit 7) of data register D0 indicates a multiple multiply operation. Multiplier 220 can multiply two 16 bit numbers to generate a 32 bit result or of simultaneously multiplying two pair of 8 bit numbers to generate a pair of 16 bit resultants. This "M" bit selects either a single 16 by 16 multiply if "M"="0", or two 8 by 8 multiplies if "M"= "1". This operation is similar to multiple arithmetic logic unit operations and will be further described below.

The "R" bit (bit 6) of data register D0 specifies whether a rounding operation takes place on the resultant from multiplier 220. If the "R" bit is "1", the a rounding operation, explained below together with the operation of multiplier 220, takes place. If the "R" bit is "0", then no rounding takes place and the 32 bit resultant form multiplier 220 is written into the destination register. Note that use of a predetermined bit in data register D0 is merely a preferred embodiment for triggering this mode. It is equally feasible to enable the rounding mode via a predetermined instruction word bit.

The "DBR" field (bits 4–0) of data register D0 specifies a default barrel rotate amount used barrel rotator 235 during certain instructions. The "DBR" field specifies the number of bit positions that barrel rotator 235 rotates left. These 5 bits can specify a left rotate of 0 to 31 places. The value of the "DBR" field may also be supplied to mask generator 239 via multiplexer Mmux 234. Mask generator 239 forms a mask supplied to the C-port of arithmetic logic unit 230. The operation of mask generator 239 will be discussed below.

Multiplier 220 is a hardware single cycle multiplier. As described above, multiplier 220 operates to multiply a pair of 16 bit numbers to obtain a 32 bit resultant or to multiply two pairs of 8 bit numbers to obtain two 16 bit resultants in the same 32 bit data word.

Multiplier first input bus 201 is a 32 bit bus sourced from a data register within data registers 200 selected by the instruction word. The 16 least significant bits of multiplier first input bus 201 supplies a first 16 bit input to multiplier 220. The 16 most significant bits of multiplier first input bus 201 supplies the 16 least significant bits of a first input to a 32 bit multiplexer Rmux 221. This data routing is the same for both the 16 bit by 16 bit multiply and the dual 8 bit by 8 bit multiply. The 5 least significant bits multiplier first input bus 201 supply a first input to a multiplexer Smux 231.

Multiplier second input bus 202 is a 32 bit bus sourced from one of the data registers 200 as selected by the instruction word or from a 32 bit, 5 bit or 1 bit immediate value imbedded in the instruction word. A multiplexer Imux 222 supplies such an immediate multiplier second input bus 202 via a buffer 223. The instruction word controls multiplexer Imux 222 to supply either 32 bits, 5 bits or 1 bit from an immediate field of the instruction word to multiplier second input bus 202 when executing an immediate instruction. The short immediate fields are zero extended in multiplexer Imux 222 upon supply to multiplier second input bus 202. The 16 least significant bits of multiplier second input bus 202 supplies a second 16 bit input to multiplier 220. This data routing is the same for both the 16 bit by 16 bit multiply and the dual 8 bit by 8 bit multiply. Multiplier second input bus 202 further supplies one input to multiplexer Amux 232 and one input to multiplexer Cmux 233. The 5 least significant bits of multiplier second input bus 202 supply one input to multiplexer Mmux 234 and a second input to multiplexer Smux 231.

The output of multiplier 220 supplies the input of product left shifter 224. Product left shifter 224 can provide a controllable left shift of 3, 2, 1 or 0 bits. The output of multiply shift multiplexer MSmux 225 controls the amount of left shift of product left shifter 224. Multiply shift multiplexer MSmux 225 selects either bits 9–8 from the "DMS" field of data register D0 or all zeroes depending on the instruction word. In the preferred embodiment, multiply shift multiplexer MSmux 225 selects the "0" input for the instructions MPYx⁰ ADD and MPYx⁰ SUB. These instructions combine signed or unsigned multiplication with addition or subtractions using arithmetic logical unit 230. In the preferred embodiment, multiply shift multiplexer MSmux 225 selects bits 9–8 of data register D0 for the instructions MPYx⁰ EALUx. These instructions combine signed or unsigned multiplication with one of two types of extended arithmetic logic unit instructions using arithmetic logic unit 230. The operation of data unit 110 when executing these instructions will be further described below. Product left shifter 224 discards the most significant bits shifted out and fills the least significant bits shifted in with zeros. Product left shifter 224 supplies a 32 bit output connected to a second input of multiplexer Rmux 221.

Adder 226 has three inputs. A first input is set to all zeros. A second input receives the 16 most significant bits (bits 31–16) of the left shifted resultant of multiplier 220. A carry-in input receives the output of bit 15 of this left shifter resultant of multiplier 220. Multiplexer Rmux 221 selects either the entire 32 bit resultant of multiplier 220 as shifted by product left shifter 224 to supply to multiply destination bus 203 via multiplexer Bmux 227 or the sum from adder 226 forms the 16 most significant bits and the 16 most significant bits of multiplier first input bus 201 forms the 16 least significant bits. As noted above, in the preferred embodiment the state of the "R" bit (bit 6) of data register D0 controls this selection at multiplexer Rmux 221. If this "R" bit is "0", then multiplexer Rmux 221 selects the shifted 32 bit resultant. If this "R" bit is "1", then multiplexer Rmux 221 selects the 16 rounded bits and the 16 most significant bits of multiplier first input bus 201. Note that it is equally feasible to control multiplexer Rmux 221 via an instruction word bit.

Adder 226 enables a multiply and round function on a 32 bit data word including a pair of packed 16 bit half words. Suppose that a first of the data registers 200 stores a pair of packed half words (a:b), a second data register stores a first half word coefficient (X:c1) and a third data register stores a second half word coefficient (X:c2), where X may be any data. The desired resultant is a pair of packed half words (a*c2:b*c1) with a*c2 and b*c1 each being the rounded most significant bits of the product. The desired resultant may be formed in two instructions using adder 226 to perform the rounding. The first instruction is:

$$mdst = msrc1 * msrc2$$

$$(b*c1:a) = (a:b)*(X:c1)$$

As previously described multiplier first input bus 201 supplies its 16 least significant bits, corresponding to b, to the first input of multiplier 220. At the same time multiply second input bus 202 supplies its 16 least significant bits, corresponding to c1, to the second input of multiplier 220. This 16 by 16 bit multiply produces a 32 bit product. The 16 most significant bits of the 32 bit resultant form one input to adder 226 with "0" supplied to the other input of adder 226. If bit 15 of the 32 bit resultant is "1", then the 16 most significant bits of the resultant is incremented, otherwise these 16 most significant bits are unchanged. Thus the 16 most significant bits of the multiply operation are rounded in adder 226. Note that one input to multiplexer Rmux 221 includes the 16 bit resultant from adder 226 as the 16 most significant bits and the 16 most significant bits from multiplier first input bus 201, which is the value a, as the least significant bits. Also note that the 16 most significant bits on multiplier second input bus 202 are discarded, therefore their initial state is unimportant. Multiplexer Rmux selects the combined output from adder 226 and multiplier first input bus 201 for storage in a destination register in data registers 200.

The packed word multiply/round operation continues with another multiply instruction. The resultant (b*c1:a) of the first multiply instruction is recalled via multiply first input bus 201. This is shown below:

$$mdst = msrc1 * msrc2$$

$$(a*c2{:}b*c1) = (b*c1{:}a)*(X{:}c2)$$

The multiply occurs between the 16 least significant bits on the multiplier first input bus 201, the value a, and the 16 least significant bits on the multiplier second input bus 202, the value c2. The 16 most significant bits of the resultant are rounded using adder 226. These bits become the 16 most significant bits of one input to multiplexer Rmux 221. The 16 most significant bits on multiplier first input bus 201, the value b*c1, becomes the 16 least significant bits of the input to multiplexer Rmux 221. The 16 most significant bits on the multiplier second input bus 202 are discarded. Multiplexer Rmux 221 then selects the desired resultant (a*c2:b*c1) for storage in data registers 200 via multiplexer Bmux 227 and multiplier destination bus 203. Note that this process could also be performed on data scaled via product left shifter 224, with adder 226 always rounding the least significant bit retained. Also note that the factors c1 and c2 may be the same or different.

This packed word multiply/round operation is advantageous because the packed 16 bit numbers can reside in a single register. In addition fewer memory loads and stores are needed to transfer such packed data than if this operation was not supported. Also note that no additional processor cycles are required in handling this packed word multiply/rounding operation. The previous description of the packed word multiply/round operation partitioned multiplier first input bus 201 into two equal halves. This is not necessary to employ the advantages of this invention. As a further example, it is feasible to partition multiplier first input bus 201 into four 8 bit sections. In this further example multiplier 220 forms the product of the 8 least significant bits of multiplier first input bus 201 and the 8 least significant bits of multiplier second input bus 202. After optional scaling in product left shifter 224 and rounding via adder 226, the 8 most significant bits of the product form the most significant bits of one input to multiplexer Mmux 221. In this further example, the least significant 24 bits of this second input to multiplexer Mmux 221 come from the most significant 24 bits on multiplier first input bus 201. This further example permits four 8 bit multiplies on such a packed word in 4 passes through multiplier 220, with all the intermediate results and the final result packed into one 32 bit data word. To further generalize, this invention partitions the original N bit data word into a first set of M bits and a second set of L bits. Following multiplication and rounding, a new data word is formed including the L most significant bits of the product and the first set of M bits from the first input. The data order in the resultant is preferably shifted or rotated in some way to permit repeated multiplications using the same technique. As in the further example described above, the number of bits M need not equal the number of bits L. In addition, the sum of M and L need not equal the original number of bits N.

In the preferred embodiment the round function selected by the "R" (bit 6) of data register D0 is implemented in a manner to increase its speed. Multiplier 220 employs a common hardware multiplier implementation that employs internally a redundant-sign-digit notation. In the redundant-sign-digit notation each bit of the number is represented by a magnitude bit and a sign bit. This known format is useful in the internal operation of multiplier 220 in a manner not important to this invention. Multiplier 220 converts the resultant from this redundant-sign-digit notation to standard binary notation before using the resultant. Conventional conversion operates by subtracting the negative signed magnitude bits from the positive signed magnitude bits. Such a subtraction ordinarily involves a delay due to borrow ripple from the least significant bit to the most significant bit. In the packed multiply/round operation the desired result is the 16 most significant bits and the rounding depends upon bit 15, the next most significant bit. Though the results are the most significant bits, the borrow ripple from the least significant bit may affect the result. Conventionally the borrow ripple must propagate from the least significant bit to bit 15 before being available to make the rounding decision.

Arithmetic logic unit 230 performs arithmetic and logic operations within data unit 110. Arithmetic logic unit 230 advantageously includes three input ports for performing three input arithmetic and logic operations. Numerous buses and auxiliary hardware supply the three inputs.

Input A bus 241 supplies data to an A-port of arithmetic logic unit 230. Multiplexer Amux 232 supplies data to input A bus 241 from either multiplier second input bus 202 or arithmetic logic unit first input bus 205 depending on the instruction. Data on multiplier second input bus 202 may be from a specified one of data registers 200 or from an immediate field of the instruction via multiplexer Imux 222 and buffer 223. Data on arithmetic logic unit first input bus 205 may be from a specified one of data registers 200 or from global port source data bus Gsrc bus 105 via buffer 106. Thus the data supplied to the A-port of arithmetic logic unit 230 may be from one of the data registers 200, from an immediate field of the instruction word or a long distance source from another register of digital image/graphics processor 71 via global source data bus Gsrc 105 and buffer 106.

Input B bus 242 supplies data to the B-port of arithmetic logic unit 230. Barrel rotator 235 supplies data to input B bus 242. Thus barrel rotator 235 controls the input to the B-port of arithmetic logic unit 230. Barrel rotator 235 receives data from arithmetic logic unit second input bus 206. Arithmetic logic unit second input bus 206 supplies data from a specified one of data registers 200, data from global port source data bus Gsrc bus 105 via buffer 104 or a special data word from buffer 236. Buffer 236 supplies a 32 bit data constant of "00000000000000000000000000000001" (also called Hex "1") to arithmetic logic unit second input bus 206 if enabled. Note hereinafter data or addresses preceded by "Hex" are expressed in hexadecimal. Data from global port source data bus Gsrc 105 may be supplied to barrel rotator 235 as a long distance source as previously described. When buffer 236 is enabled, barrel rotator 235 enables generation on input B bus 242 of any constant of the form $2^N$, where N is the barrel rotate amount. Constants of this form are useful in operations to control only a single bit of a 32 bit data word. The data supplied to arithmetic logic unit second input bus 206 and barrel rotator 235 depends upon the instruction.

Barrel rotator 235 is a 32 bit rotator that may rotate its received data from 0 to 31 positions. It is a left rotator, however, a right rotate of n bits may be obtained by left rotating 32—n bits. A five bit input from rotate bus 244 controls the amount of rotation provided by barrel rotator 235. Note that the rotation is circular and no bits are lost. Bits rotated out the left of barrel rotator 235 wrap back into the right. Multiplexer Smux 231 supplies rotate bus 244. Multiplexer Smux 231 has several inputs. These inputs include the five least significant bits of multiplier first input bus 201; the five least significant bits of multiplier second input bus 202; five bits from the "DBR" field of data register D0; and a five bit zero constant "00000". Note that because multiplier second input bus 202 may receive immediate data via multiplexer Imux 222 and buffer 223, the instruction word can supply an immediate rotate amount to barrel rotator 235. Multiplexer Smux 231 selects one of these inputs to determine the amount of rotation in barrel rotator 235 depending on the instruction. Each of these rotate quantities is five bits and thus can set a left rotate in the range from 0 to 31 bits.

Barrel rotator 235 also supplies data to multiplexer Bmux 227. This permits the rotated data from barrel rotator 235 to be stored in one of the data registers 200 via multiplier destination bus 203 in parallel with an operation of arithmetic logic unit 230. Barrel rotator 235 shares multiplier destination bus 203 with multiplexer Rmux 221 via multiplexer Bmux 227. Thus the rotated data cannot be saved if a multiply operation takes place. In the preferred embodiment this write back method is particularly supported by extended arithmetic logic unit operations, and can be disabled by specifying the same register destination for barrel rotator 235 result as for arithmetic logic unit 230 result. In this case only the result of arithmetic logic unit 230 appearing on arithmetic logic unit destination bus 204 is saved.

Although the above description refers to barrel rotator 235, those skilled in the art would realize that substantial utility can be achieved using a shifter which does not wrap around data. Particularly for shift and mask operations where not all of the bits to the B-port of arithmetic logic unit 230 are used, a shifter controlled by rotate bus 244 provides the needed functionality. In this event an additional bit, such as the most significant bit on the rotate bus 244, preferably indicates whether to form a right shift or a left shift. Five bits on rotate bus 244 are still required to designate the magnitude of the shift. Therefore it should be understood in the description below that a shifter may be substituted for barrel rotator 235 in many instances.

Input C bus 243 supplies data to the C-port of arithmetic logic unit 230. Multiplexer Cmux 233 supplies data to input C bus 243. Multiplexer Cmux 233 receives data from four sources. These are LMO/RMO/LMBC/RMBC circuit 237, expand circuit 238, multiplier second input bus 202 and mask generator 239.

LMO/RMO/LMBC/RMBC circuit 237 is a dedicated hardware circuit that determines either the left most "1", the right most "1", the left most bit change or the right most bit change of the data on arithmetic logic unit second input bus 206 depending on the instruction or the "FMOD" field of data register D0. LMO/RMO/LMBC/RMBC circuit 237 supplies to multiplexer Cmux 233 a 32 bit number having a value corresponding to the detected quantity. The left most bit change is defined as the position of the left most bit that is different from the sign bit 32. The right most bit change is defined as the position of the right most bit that is different from bit 0. The resultant is, a binary number corresponding to the detected bit position as listed below in Table 8. The values are effectively the big endian bit number of the detected bit position, where the result is 31-(bit position).

TABLE 8

| Bit Position | Result |
| --- | --- |
| 0 | 31 |
| 1 | 30 |
| 2 | 29 |
| 3 | 28 |
| 4 | 27 |
| 5 | 26 |
| 6 | 25 |

TABLE 8-continued

| Bit Position | Result |
| --- | --- |
| 7 | 24 |
| 8 | 23 |
| 9 | 22 |
| 10 | 21 |
| 11 | 20 |
| 12 | 19 |
| 13 | 18 |
| 14 | 17 |
| 15 | 16 |
| 16 | 15 |
| 17 | 14 |
| 18 | 13 |
| 19 | 12 |
| 20 | 11 |
| 21 | 10 |
| 22 | 9 |
| 23 | 8 |
| 24 | 7 |
| 25 | 6 |
| 26 | 5 |
| 27 | 4 |
| 28 | 3 |
| 29 | 2 |
| 30 | 1 |
| 31 | 0 |

This determination is useful for normalization and for image compression to find a left most or right most "1" or changed bit as an edge of an image. The LMO/RMO/LMBC/RMBC circuit 237 is a potential speed path, therefore the source coupled to arithmetic logic unit second input bus 206 is preferably limited to one of the data registers 200. For the left most "1" and the right most "1" operations, the "V" bit indicating overflow of status register 210 is set to "1" if there were no "1's" in the source, and "0" if there were. For the left most bit change and the right most bit change operations, the "V" bit is set to "1" if all bits in the source were equal, and "0" if a change was detected. If the "V" bit is set to "1" by any of these operations, the LMO/RMO/LMBC/RMBC result is effectively 32. Further details regarding the operation of status register 210 appear above.

Expand circuit 238 receives inputs from multiple flags register 211 and status register 210. Based upon the "Msize" field of status register 210 described above, expand circuit 238 duplicates some of the least significant bits stored in multiple flags register 211 to fill 32 bits. Expand circuit 238 may expand the least significant bit 32 times, expand the two least significant bits 16 times or expand the four least significant bits 8 times. The "Asize" field of status register 210 controls processes in which the 32 bit arithmetic logic unit 230 is split into independent sections for independent data operations. This is useful for operation on pixels sizes less than the 32 bit width of arithmetic logic unit 230. This process, as well as examples of its use, will be further described below.

Mask generator 239 generates 32 bit masks that may be supplied to the input C bus 243 via multiplexer Cmux 233. The mask generated depends on a 5 bit input from multiplexer Mmux 234. Multiplexer Mmux 234 selects either the 5 least significant bits of multiplier second input bus 202, or the "DBR" field from data register D0. In the preferred embodiment, an input of value N causes mask generator 239 to generate a mask generated that has N "1's" in the least significant bits, and 32—N "0's" in the most significant bits. This forms an output having N right justified "1's". This is only one of four possible methods of operation of mask generator 239. In a second embodiment, mask generator 239 generates the mask having N right justified "0's", that is N "0's" in the least significant bits and N—32 "1's" in the most significant bits. It is, equally feasible for mask generator 239 to generate the mask having N left justified "1's" or N left justified "0's". Table 9 illustrates the operation of mask generator 239 in accordance with the preferred embodiment when multiple arithmetic is not selected.

TABLE 9

| Mask Generator Input | Mask — Nonmultiple Operations | | | | | | | |
|---|---|---|---|---|---|---|---|---|
| 0 0 0 0 0 | 0000 | 0000 | 0000 | 0000 | 0000 | 0000 | 0000 | 0000 |
| 0 0 0 0 1 | 0000 | 0000 | 0000 | 0000 | 0000 | 0000 | 0000 | 0001 |
| 0 0 0 1 0 | 0000 | 0000 | 0000 | 0000 | 0000 | 0000 | 0000 | 0011 |
| 0 0 0 1 1 | 0000 | 0000 | 0000 | 0000 | 0000 | 0000 | 0000 | 0111 |
| 0 0 1 0 0 | 0000 | 0000 | 0000 | 0000 | 0000 | 0000 | 0000 | 1111 |
| 0 0 1 0 1 | 0000 | 0000 | 0000 | 0000 | 0000 | 0000 | 0001 | 1111 |
| 0 0 1 1 0 | 0000 | 0000 | 0000 | 0000 | 0000 | 0000 | 0011 | 1111 |
| 0 0 1 1 1 | 0000 | 0000 | 0000 | 0000 | 0000 | 0000 | 0111 | 1111 |
| 0 1 0 0 0 | 0000 | 0000 | 0000 | 0000 | 0000 | 0000 | 1111 | 1111 |
| 0 1 0 0 1 | 0000 | 0000 | 0000 | 0000 | 0000 | 0001 | 1111 | 1111 |
| 0 1 0 1 0 | 0000 | 0000 | 0000 | 0000 | 0000 | 0011 | 1111 | 1111 |
| 0 1 0 1 1 | 0000 | 0000 | 0000 | 0000 | 0000 | 0111 | 1111 | 1111 |
| 0 1 1 0 0 | 0000 | 0000 | 0000 | 0000 | 0000 | 1111 | 1111 | 1111 |
| 0 1 1 0 1 | 0000 | 0000 | 0000 | 0000 | 0001 | 1111 | 1111 | 1111 |
| 0 1 1 1 0 | 0000 | 0000 | 0000 | 0000 | 0011 | 1111 | 1111 | 1111 |
| 0 1 1 1 1 | 0000 | 0000 | 0000 | 0000 | 0111 | 1111 | 1111 | 1111 |
| 1 0 0 0 0 | 0000 | 0000 | 0000 | 0000 | 1111 | 1111 | 1111 | 1111 |
| 1 0 0 0 1 | 0000 | 0000 | 0000 | 0001 | 1111 | 1111 | 1111 | 1111 |
| 1 0 0 1 0 | 0000 | 0000 | 0000 | 0011 | 1111 | 1111 | 1111 | 1111 |
| 1 0 0 1 1 | 0000 | 0000 | 0000 | 0111 | 1111 | 1111 | 1111 | 1111 |
| 1 0 1 0 0 | 0000 | 0000 | 0000 | 1111 | 1111 | 1111 | 1111 | 1111 |
| 1 0 1 0 1 | 0000 | 0000 | 0001 | 1111 | 1111 | 1111 | 1111 | 1111 |
| 1 0 1 1 0 | 0000 | 0000 | 0011 | 1111 | 1111 | 1111 | 1111 | 1111 |
| 1 0 1 1 1 | 0000 | 0000 | 0111 | 1111 | 1111 | 1111 | 1111 | 1111 |
| 1 1 0 0 0 | 0000 | 0000 | 1111 | 1111 | 1111 | 1111 | 1111 | 1111 |
| 1 1 0 0 1 | 0000 | 0001 | 1111 | 1111 | 1111 | 1111 | 1111 | 1111 |
| 1 1 0 1 0 | 0000 | 0011 | 1111 | 1111 | 1111 | 1111 | 1111 | 1111 |
| 1 1 0 1 1 | 0000 | 0111 | 1111 | 1111 | 1111 | 1111 | 1111 | 1111 |
| 1 1 1 0 0 | 0000 | 1111 | 1111 | 1111 | 1111 | 1111 | 1111 | 1111 |
| 1 1 1 0 1 | 0001 | 1111 | 1111 | 1111 | 1111 | 1111 | 1111 | 1111 |
| 1 1 1 1 0 | 0011 | 1111 | 1111 | 1111 | 1111 | 1111 | 1111 | 1111 |
| 1 1 1 1 1 | 0111 | 1111 | 1111 | 1111 | 1111 | 1111 | 1111 | 1111 |

A value N of "0" thus generates 32 "0's". In some situations however it is preferable that a value of "0" generates 32 "1's". This function is selected by the "%!" modification specified in the "FMOD" field of status register 210 or in bits 52, 54, 56 and 58 of the instruction when executing an extended arithmetic logic unit operation. This function can be implemented by changing the mask generated by mask generator 239 or by modifying the function of arithmetic logic unit 230 so that mask of all "0's" supplied to the C-port operates as if all "1's" were supplied. Note that similar modifications of the other feasible mask functions are possible. Thus the "%!" modification can change a mask generator 239, which generates a mask having N right justified "0's" to all "0's" for N=0. Similarly, the "%!" modification can change a mask generator 239 which generates N left justified "1's" to all "1's" for N=0, or change a mask generator 239 which generates N left justified "0's" to all "0's" for N=0.

Selection of multiple arithmetic modifies the operation of mask generator 239. When the "Asize" field of status register is "110", this selects a data size of 32 bits and the operation of mask generator 239 is unchanged from that shown in Table 9. When the "Asize" field of status register is "101", this selects a data size of 16 bits and mask generator 239 forms two independent 16 bit masks. This is shown in Table 10. Note that in this case the most significant bit of the input to mask generator 239 is ignored. Table 10 shows this bit as a don't care "X".

TABLE 10

| Mask Generator Input | Mask — Half Word Operation | | | | | | | |
|---|---|---|---|---|---|---|---|---|
| X 0 0 0 0 | 0000 | 0000 | 0000 | 0000 | 0000 | 0000 | 0000 | 0000 |
| X 0 0 0 1 | 0000 | 0000 | 0000 | 0001 | 0000 | 0000 | 0000 | 0001 |
| X 0 0 1 0 | 0000 | 0000 | 0000 | 0011 | 0000 | 0000 | 0000 | 0011 |
| X 0 0 1 1 | 0000 | 0000 | 0000 | 0111 | 0000 | 0000 | 0000 | 0111 |
| X 0 1 0 0 | 0000 | 0000 | 0000 | 1111 | 0000 | 0000 | 0000 | 1111 |
| X 0 1 0 1 | 0000 | 0000 | 0001 | 1111 | 0000 | 0000 | 0001 | 1111 |
| X 0 1 1 0 | 0000 | 0000 | 0011 | 1111 | 0000 | 0000 | 0011 | 1111 |
| X 0 1 1 1 | 0000 | 0000 | 0111 | 1111 | 0000 | 0000 | 0111 | 1111 |
| X 1 0 0 0 | 0000 | 0000 | 1111 | 1111 | 0000 | 0000 | 1111 | 1111 |
| X 1 0 0 1 | 0000 | 0001 | 1111 | 1111 | 0000 | 0001 | 1111 | 1111 |
| X 1 0 1 0 | 0000 | 0011 | 1111 | 1111 | 0000 | 0011 | 1111 | 1111 |
| X 1 0 1 1 | 0000 | 0111 | 1111 | 1111 | 0000 | 0111 | 1111 | 1111 |
| X 1 1 0 0 | 0000 | 1111 | 1111 | 1111 | 0000 | 1111 | 1111 | 1111 |
| X 1 1 0 1 | 0001 | 1111 | 1111 | 1111 | 0001 | 1111 | 1111 | 1111 |
| X 1 1 1 0 | 0011 | 1111 | 1111 | 1111 | 0011 | 1111 | 1111 | 1111 |
| X 1 1 1 1 | 0111 | 1111 | 1111 | 1111 | 0111 | 1111 | 1111 | 1111 |

The function of mask generator 239 is similarly modified for a selection of byte data via an "Asize" field of "100". Mask generator 239 forms four independent masks using only the three least significant bits of its input. This is shown in Table 11.

TABLE 11

| Mask Generator Input | Mask — Byte Operation | | | | | | | |
|---|---|---|---|---|---|---|---|---|
| X X 0 0 0 | 0000 | 0000 | 0000 | 0000 | 0000 | 0000 | 0000 | 0000 |
| X X 0 0 1 | 0000 | 0001 | 0000 | 0001 | 0000 | 0001 | 0000 | 0001 |
| X X 0 1 0 | 0000 | 0011 | 0000 | 0011 | 0000 | 0011 | 0000 | 0011 |
| X X 0 1 1 | 0000 | 0111 | 0000 | 0111 | 0000 | 0111 | 0000 | 0111 |
| X X 1 0 0 | 0000 | 1111 | 0000 | 1111 | 0000 | 1111 | 0000 | 1111 |
| X X 1 0 1 | 0001 | 1111 | 0001 | 1111 | 0001 | 1111 | 0001 | 1111 |
| X X 1 1 0 | 0011 | 1111 | 0011 | 1111 | 0011 | 1111 | 0011 | 1111 |
| X X 1 1 1 | 0111 | 1111 | 0111 | 1111 | 0111 | 1111 | 0111 | 1111 |

As noted above, it is feasible to support multiple operations of 8 sections of 4 bits each, 16 sections of 2 bits each and 32 single bit sections. Those skilled in the art would realize that these other data sizes require similar modification to the operation of mask generator 239 as shown above in Tables 9, 10, and 11.

Data unit 110 includes a three input arithmetic logic unit 230. Arithmetic logic unit 230 includes three input inputs: input A bus 241 supplies an input to an A-port; input B bus 242 supplies an input to a B-port; and input C bus 243 supplies an input to a C-port. Arithmetic logic unit 230 supplies a resultant to arithmetic logic unit destination bus 204. This resultant may be stored in one of the data registers of data registers 200. Alternatively the resultant may be stored in another register within digital image/graphics processor 71 via buffer 108 and global port destination data bus Gdst 107. This function is called a long distance operation. The instruction specifies the destination of the resultant. Function signals supplied to arithmetic logic unit 230 from function signal generator 245 determine the particular three input function executed by arithmetic logic unit 230 for a particular cycle. Bit 0 carry-in generator 246 forms a carry-in signal supplied to bit 0, the first bit of arithmetic logic unit 230. As previously described, during multiple arithmetic operations bit 0 carry-in generator 246 supplies the carry-in signal to the least significant bit of each of the multiple sections.

Figure 9:
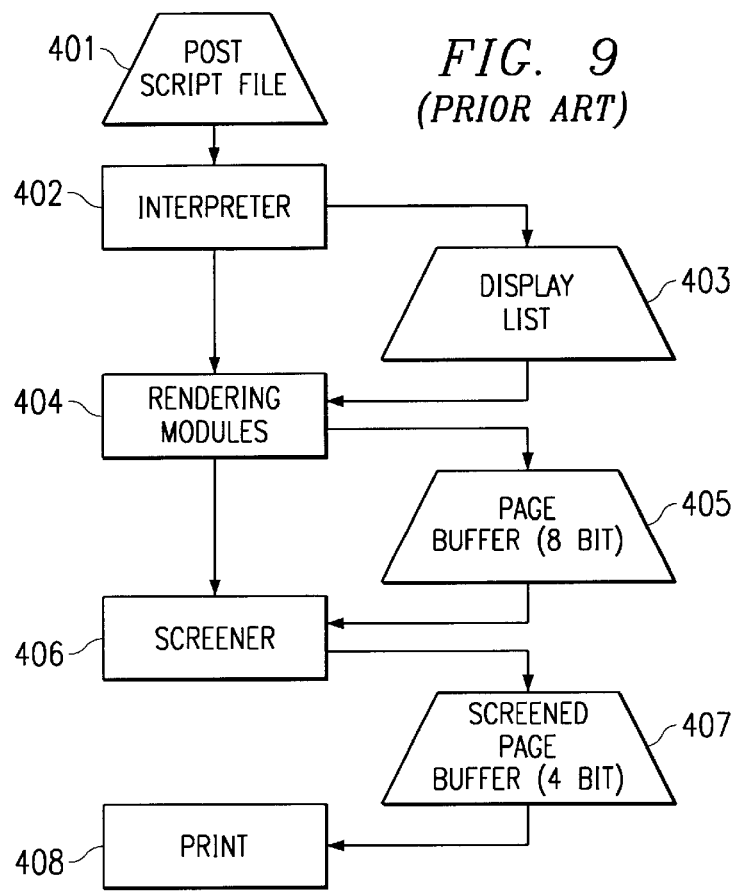
FIG. 9 illustrates the steps typically executed when printing a document specified-in a page description language.

FIG. 9 illustrates the steps typically executed when a document specified in a page description language, such as PostScript, is to be printed. Following receipt of the print file (input data file 401) is interpretation (processing block 402). In this step, the input PostScript file is interpreted and converted into an intermediate form called the display list (data file 403). The display list 403 consists of a list of low level primitives such as trapezoids, fonts, images, etc. that make up the described page. Next the display list is rendered (processing block 404). Each element in the display list 403 is processed in this step and the output is written into a buffer known as the page buffer (data file 405). The page buffer 405 represents a portion of the output image for a particular color plane. In the page buffer 405, each pixel is typically represented by 8 bits. After all the elements in display list 403 have been processed, page buffer 405 contains the output image in an 8 bit format. Next the page buffer is screened (processing block 406). The resolution supported by the printing device may be anywhere between 1 to 8 bits per pixel. Page buffer 405 developed in the rendering step 404 has to be converted into the resolution supported by the printer. The thus converted data is called the device image. Each pixel in page buffer 405 has to be converted to its corresponding device pixel value. For instance, in the case of a 4 bit device pixel, each pixel in page buffer 405 has to be converted to a 4 bit value. This process called screening results in a screened page buffer (data file 407). Next comes printing (processing block 408). Each pixel in the screened page buffer 407 is printed on the paper. This process is repeated for all the color planes, cyan, yellow, magenta and black.

In multi (N) level threshold screening, a set of thresholds ($T_0=0, T_1, T_2, \ldots T_{N-1}$) are defined for each pixel location in a cell that tiles a page. If the input gray level $G_{in}$ lies in the interval ($T_i, T_{i+1}$), the output level $G_{out}$ is set to i. If there are 16 thresholds this approach requires 16 comparisons per pixel. This is considered prohibitively expensive for real-time implementations.

This invention proposes a range reduction approach. A pixel is indexed into one of a plurality of threshold bins. The bins are sub-divided into sub-bins. The indexing proceeds recursively, till the lowest threshold bin corresponding to the output level is identified. For example, consider bins of two threshold values. Effectively, a pixel is compared to threshold $T_{N/2}$ first. Based on the result, the pixel is compared with $T_{N/4}$ or $T_{N/2+N/4}$ next, and so on. This approach requires only $\log_2(N)$ comparisons to determine the output level. The preferred embodiment of this invention uses a splittable arithmetic logic unit together with the above concept resulting in an efficient implementation of quaternary range reducing search. In an alternative embodiment which requires some constraints on the output levels described below, screening can be reduced to a subtraction and clipping operation. Again using a splittable arithmetic logic unit to process plural pixels can used to perform efficient screening.

Prior art techniques use N comparisons to determine on of the N output levels. This invention uses only $\log_m(N)$ comparisons, where m is the number of simultaneously threshold comparisons. For a binary search m is 2, thus a N level search requires $\log_2(N)$ comparisons. A quaternary search requires $\log_4(N)$ comparisons. This technique enables real-time implementation of threshold screening using a splittable arithmetic logic unit such as digital image/graphics processors 71, 72 73 and 74 described above. This in turn permits larger sized screen cells to fit into on-chip memory as compared to the prior art look-up table technique. The bandwidth needed for loading and reloading look-up tables is reduced. Additionally where the output values permit use of the constrained thresholding approach, there is significant reduction in threshold array size and in the bandwidth required to access a threshold array stored in external memory.

Multilevel (N output level) threshold screening involves mapping the input pixel values into a plurality of threshold bins. The bin hit determines the output gray scale value. Usually the page is composed with a repeating screening cell. Thus only the thresholds for each pixel in that screening cell are needed. For example, given a 4 by 4 pixel screening cell and 16 output levels, 4*4*16 or 256 thresholds need to be specified. The prior art look-up table technique requires 256 entries per pixel in a cell assuming an 8-bit input. Though this implementation is fast, it requires more memory than an approach that only stores the threshold values. For example, for 16 output levels, the storage required for a threshold array is 16 bytes per pixel in a cell. This is 1/16 of the storage required by the look-up table approach. Thus threshold screening may be advantageous over look-up table based screening.

This invention is based on successive range reduction to reduce the number of comparisons required for threshold screening. This approach is suited for a digital signal processor based implementation. In the most elemental form the search for the correct output level is a binary search. The gray scale value of pixel is first compared to threshold $T_{N/2}$. Based on the result of this comparison, the pixel is then compared with $T_{N/4}$ or $T_{N/2+N/4}$. This binary tree comparison repeats until the threshold bin is determined. Only $\log_2(N)$ comparisons are needed to determine the output level using this technique.

An extension of the binary search is a quaternary search. The range is first reduced to 4 sub-ranges by comparison with four initial thresholds. The sub-ranges are reduced recursively until the correct threshold bin is determined. This technique is particularly valuable if the four comparisons can be made simultaneously. This advantageously used the splittable arithmetic logic unit 230 of digital image/graphics processors 230. Given this capability, such a quaternary search can be efficiently implemented. This technique requires $\log_4(N)$ comparisons.

Figure 10:
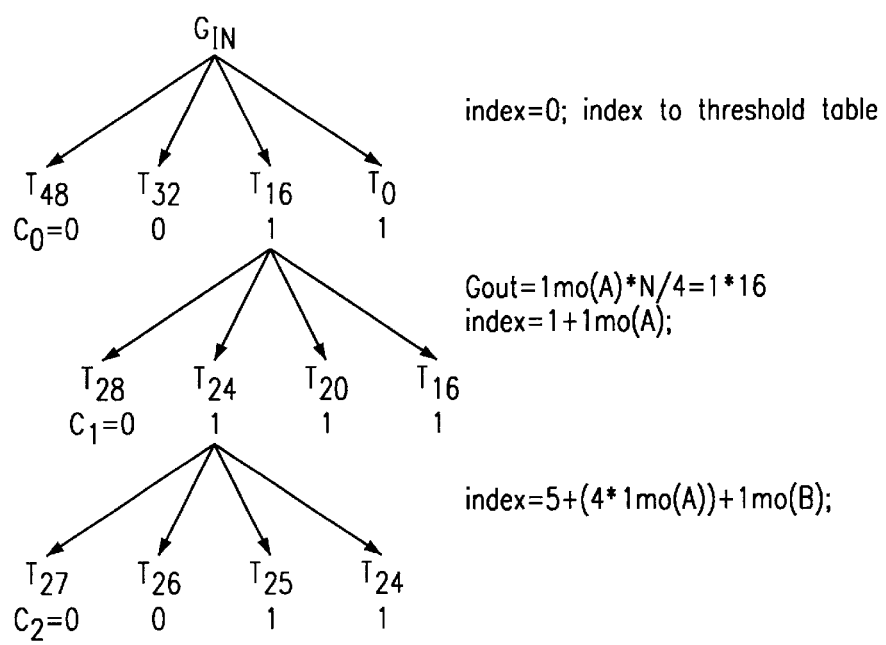
FIG. 10 illustrates the operation of this invention for an example having 64 thresholds corresponding to output levels.

FIG. 10 illustrates the operation of the invention for an example where there are 64 thresholds corresponding to output levels. In this example $G_{in}$ is between $T_{25}$ and $T_{26}$. Only the relevant part of the search tree is illustrated in FIG. 10. The 64 thresholds are first divided into 4 sub-ranges [$T_0$, $T_{16}$], [$T_{16}$, $T_{32}$], [$T_{32}$, $T_{48}$] and [$T_{48}$, $T_{63}$]. The correct sub-range is identified by comparing $G_{in}$ with $T_{48}$, $T_{32}$, $T_{16}$ and $T_0$. This comparison selects another set of four sub-ranges for another comparison with the input gray scale value $G_{in}$.

For 8-bit data the four comparisons can be performed simultaneously using splittable arithmetic logic unit 230. The 8-bit input data $G_{in}$ is repeated in each of four sections in a 32-bit data word. For the initial comparison four threshold values $T_{48}$, $T_{32}$, $T_{16}$ and $T_0$ are likewise packed into a 32-bit data word the this order. A four section multiple subtract operation in arithmetic logic unit 230 performs the four comparisons. The carry (borrow) output of each section of the splittable arithmetic logic unit 230 is stored in the multiple flags register 211 forming a 4 bit number with multiple flags register 211 cleared prior to receiving the status bits. Each bit corresponds to the comparison result of one section. This operation can be viewed as follows:

$$D1 = G - TH_0$$

$$(D1_3:D1_2:D1_1:D1_0) = (G_{in}:G_{in}:G_{in}:G_{in}) - (T_{48}:T_{32}:T_{16}:T_0)$$

where: D1 is the designation of a temporary data register, $D1_3$, $D1_2$, $D1_1$ and $D1_0$ being respective byte sections of this register; G is the input gray scale level of the 8-bit $G_{in}$ packed 4 times into a 32 bit register; and $TH_0$ is the four initial threshold values $T_{48}$, $T_{32}$, $T_{16}$ and $T_0$ packed into a 32-bit register. The only important result is the status bits stored in multiple flags register 211. A 1 carry output signifies that $G_{in}$ is greater than or equal to the corresponding threshold. In this example, FIG. 10 shows that $G_{in}$ has a value between $T_{32}$ and T16, thus four least significant bits of multiple flags register 211 store 0011. Because multiple flags register 211 was cleared prior to storing the status bits, its most significant bits are all 0. This result indicates that the next set of comparisons should cover the interval between $T_{32}$ and $T_{16}$. This information is extracted from multiple flags register 211 by a left most one operation using LMO/RMO/LMBC/RMBC circuit 237.

D1=MF
D2=lmo(D1)
D3=D2+1

The two stage operation to obtain the left most one is necessary because multiple flags register 211 cannot directly source LMO/RMO/LMBC/RMBC circuit 237 (see FIG. 5). Register D2 stores a partial result of the ultimate result $G_{out}$. With the threshold values packed in order, the left most one operation on multiple flags register 211 determines which of the four ranges $G_{in}$ falls in. As previously described the left most one output of LMO/RMO/LMBC/RMBC circuit 237 is the big endian bit number of the left most 1 bit. The result of the left most one operation plus one now stored in D3 is used to index into a threshold look-up table to fetch the next set of 4 thresholds for comparison. This look-up table is shown in Table 11.

TABLE 12

| Index | Thresholds | Size |
|---|---|---|
| 0 | $T_{48}$ $T_{32}$ $T_{16}$ $T_0$ | $4^0$ |
| 1 | $T_{12}$ $T_8$ $T_4$ $T_0$ | |
| 2 | $T_{28}$ $T_{24}$ $T_{20}$ $T_{16}$ | |
| 3 | $T_{44}$ $T_{40}$ $T_{36}$ $T_{32}$ | |
| 4 | $T_{60}$ $T_{56}$ $T_{52}$ $T_{48}$ | $4^1$ |
| 5 | $T_3$ $T_2$ $T_1$ $T_0$ | |
| 6 | $T_7$ $T_6$ $T_5$ $T_4$ | |
| 7 | $T_{11}$ $T_{10}$ $T_9$ $T_8$ | |
| 8 | $T_{15}$ $T_{14}$ $T_{13}$ $T_{12}$ | |
| 9 | $T_{19}$ $T_{18}$ $T_{17}$ $T_{16}$ | |
| 10 | $T_{23}$ $T_{22}$ $T_{21}$ $T_{20}$ | |
| 11 | $T_{27}$ $T_{26}$ $T_{25}$ $T_{24}$ | |
| 12 | $T_{31}$ $T_{30}$ $T_{29}$ $T_{28}$ | |
| 13 | $T_{35}$ $T_{34}$ $T_{33}$ $T_{32}$ | |
| 14 | $T_{39}$ $T_{38}$ $T_{37}$ $T_{36}$ | |
| 15 | $T_{43}$ $T_{42}$ $T_{41}$ $T_{40}$ | |
| 16 | $T_{47}$ $T_{46}$ $T_{45}$ $T_{44}$ | |
| 17 | $T_{51}$ $T_{50}$ $T_{49}$ $T_{48}$ | |
| 18 | $T_{55}$ $T_{54}$ $T_{53}$ $T_{52}$ | |
| 19 | $T_{59}$ $T_{58}$ $T_{57}$ $T_{56}$ | |
| 20 | $T_{63}$ $T_{62}$ $T_{61}$ $T_{60}$ | $4^2$ |

It is possible to reduce the size of the threshold table of Table 12 by only specifying the last 16 entries. Entries 0 to 4 entries can be synthesized from entries 5 to 20. The last 16 entries provide the complete set of thresholds used. However, this approach has the disadvantage of requiring more processing to synthesize some of the entries in the table.

In this example, the left most one result is 1. Thus the set of thresholds for the next comparison is the index value 2 or $(T_{28}:T_{24}:T_{20}:T_{16})$. The look-up table is preferably stored in one of the data memories 22, 23, 24, 27, 28, 29, 32, 33, 34, 37, 38 or 39 associated with the digital image/graphics processor 71, 72, 73 or 74. The index result is stored in an address index register within local address unit 620. The table is accessed using an appropriate base address register storing the beginning memory location of the table with the data shown in Table 12.

The packed $G_{in}$ is then compared with the new set of packed threshold values in the same manner as above. The status bits are stored in multiple flags register 211 as before.

$$D1 = G - TH_1$$

$$(D1_3:D1_2:D1_1:D1_0) = (G_{in}:G_{in}:G_{in}:G_{in}) - (T_{28}:T_{24}:T_{20}:T_{16})$$

where: $TH_1$ is the selected second set of packed threshold values, in this example $(T_{28}:T_{24}:T_{20}:T_{16})$. In this example, FIG. 10 shows that $G_{in}$ has a value between $T_{28}$ and $T_{24}$, thus the result in the four least significant bits of multiple flags register 211 is 0111. Another partial output and index calculation is made as follows.

D1=MF
D2=D2<<2+lmo(D1)
D3=D2+5

The two place left shift provides an effective multiplication by 4 for the initial left most one determination. D2 stores the next partial output and D3 stores the next index value. In this example the left most one of the multiple flags register 211 is 2. Thus D2 stores 4*1+2 or 6 and D3 stores 6+5 or 11. The index of 11 means the next set of thresholds is $(T_{27}:T_{26}:T_{25}:T_{24})$. The third and last comparison takes place as follows.

$$D1 = G - TH_2$$

$$(D1_3:D1_2:D1_1:D1_0) = (G_{in}:G_{in}:G_{in}:G_{in}) - (T_{27}:T_{26}:T_{25}:T_{24})$$

where: $TH_2$ is the selected third set of packed threshold values, in this example $(T_{27}:T_{26}:T_{25}:T_{24})$. In this example, FIG. 10 shows that $G_{in}$ has a value between $T_{26}$ and $T_{24}$, thus the result in the four least significant bits of multiple flags register 211 is 0011. The final output calculation is made as follows.

D1=MF
D2 =D2<<2+lmo(D1)

The two place left shift provides an effective multiplication by 4 for the initial left most one determination. D2 previously stored 6, thus the final output $G_{out}$ is 6*4+1 or 25. For this example of 64 threshold levels the final output $G_{out}$ is:

$$G_{out}=lmo(C_0)*16+lmo(C_1)*4+lmo(C_2)$$

where: $C_0$, $C_1$ and $C_2$ are the respective multiple flags comparison results as shown in FIG. 10. For this example of 64 thresholds and 8-bit $G_{in}$ values three comparisons are needed and the memory required for the threshold values according to Table 12 is 21 32-bit entries or 84 bytes. This contrasts to 256 bytes needed for a pure look-up table technique. Note that the 64 threshold levels need not be uniform. These threshold values need only be monotonic so that $T_{i+1}>T_i$.

The just described threshold screening technique requires much less memory but takes more processor cycles. This may be an advantage if the threshold table can fit completely within a memory on the same integrated circuit as the digital signal processor. In this event the decreased memory access time may more than offset the use of additional processor cycles.

In general for N output-levels, $G_{out}$ is determined by the following equation:

$$p = \log_4 N$$

$$G_{out} = \sum_{I=0}^{p-1} lmo(C_i) \ddot{A}\ddot{A}\ddot{A} \frac{N}{4^i}$$

where: p is the number of comparisons required; and $C_n$ is the result of the comparison stored in multiple flags register 211 at the nth stage.

In general the approach can be applied for quantizing from 8 bits down to m bits, for m=1 to 8, where $N=2^m$ the number of output levels. Here the number of comparisons required nc, would be:

$$nc = \text{Tunc}(\log_4 2^m) + 1 = \text{Tunc}(m/2) + 1$$

where: Trunc(X) is the truncation of X, retaining the integer part and discarding any fraction. The amount of memory required is given by:

$$Mem = 4 * \sum_{I=0}^{nc-1} 4^i$$

For an m of 8, the size of the threshold tables is larger than for the pure look-up technique, thus this technique is not be practically useful. However for m from 1 to 6 the technique of this invention has distinct advantages over the pure look-up table approach.

An alternative to the technique described above uses the multiple comparisons with a look-up table rather than calculating $G_{out}$. This alternative technique requires accumulating the status bits resulting from each comparison in multiple flags register 211. As noted in Table 5, multiple flags register 211 can be automatically rotated and the status of the new comparison appended to the previous results.

Figure 11:
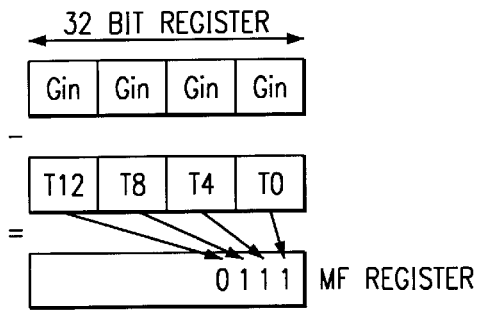
FIG. 11 illustrates the operation of a first stage of an example of an alternative of this invention having 16 thresholds.
Figure 12:
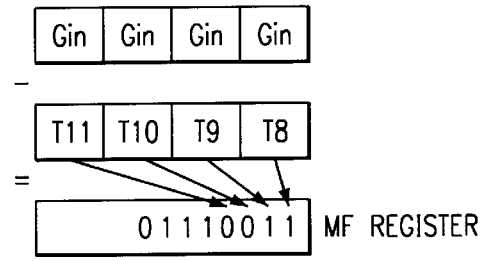
FIG. 12 illustrates the operation of a second stage of the alternative of this invention having 16 thresholds.

FIG. 11 illustrates the first stage for a multiple comparison and look-up table implementation for an example for 8-bit $G_{in}$ when there are 16 output levels. In this example $G_{in}$ is between $T_{10}$ and $T_9$, so the resulting $G_{out}$ is 9. First, a comparison is made by subtraction of four threshold levels packed in a single register from a register with $G_{in}$ in every one of four sections. Multiple flags register 211 is pre-cleared and the 4 carry bits are saved in the least significant bits of multiple flags register 211. For this example $G_{in}$ is between $T_{12}$ and $T_8$ so that four bits stored in multiple flags register 211 are 0111.

The 4 bits in multiple flags register 211 serve as an index into the threshold table to fetch the next set of thresholds for comparison. This threshold look-up table is shown in Table 13.

TABLE 13

| Multiple Flags bits | Lmo (MF) | Thresholds |
|---|---|---|
| 0001 | 0 | $T_3 T_2 T_1 T_0$ |
| 0011 | 1 | $T_7 T_E T_5 T_4$ |
| 0111 | 2 | $T_{11} T_{10} T_9 T_8$ |
| 1111 | 3 | $T_{15} T_{14} T_{13} T_{12}$ |

Table 13 also shows that this small look-up table may be indexed by the left most one of multiple flags register 211. In this example the results were 0111, so the next comparison is made with the thresholds $(T_{11}:T_{10}:T_9:T_8)$.

Figure 13:
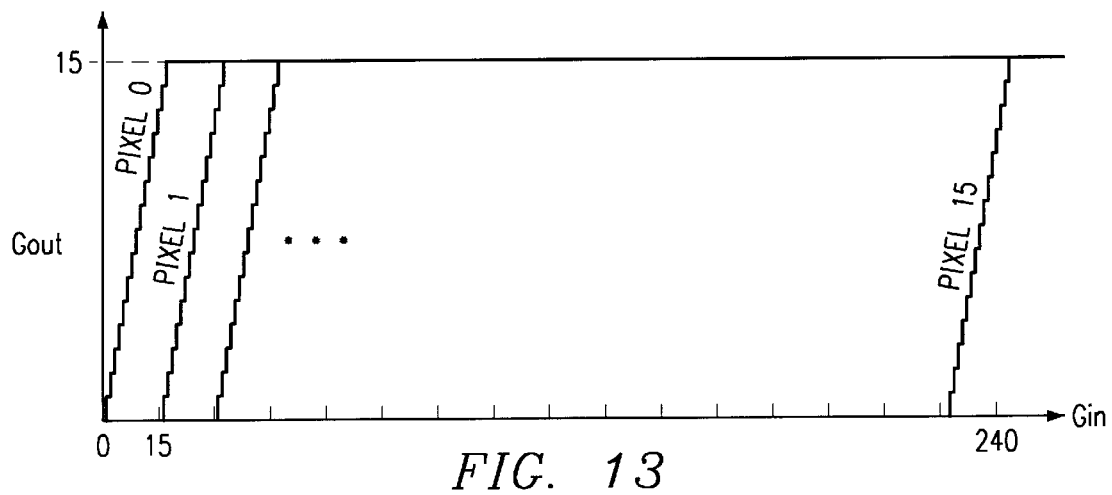
FIG. 13 illustrates the operation of a yet further alternative of this invention.

FIG. 13 illustrates a next comparison by subtraction. The packed threshold values $(T_{11}:T_{10}:T_9:T_8)$ is subtracted from the packed input $(G_{in}:G_{in}:G_{in}:G_{in})$. In this comparison multiple flags register 211 is pre-rotated left by 4 bits. The 4 carry bits of the result of the comparison are written into the 4 least significant bits of multiple flags register 211. For this example $G_{in}$ is between $T_{10}$ and $T_9$, so the four least significant bits of multiple flags register 211 are 0011.

Now multiple flags register 211 is used to index into a look-up table that directly gives the output gray level. This look-up table is shown in Table 14.

TABLE 14

| Key | Value |
|---|---|
| 0001 0001 | 0 |
| 0001 0011 | 1 |
| 0001 0111 | 2 |
| 0001 1111 | 3 |
| 0011 0001 | 4 |
| 0011 0011 | 5 |
| 0011 0111 | 6 |
| 0011 1111 | 7 |
| 0111 0001 | 8 |
| 0111 0011 | 9 |
| 0111 0111 | 10 |
| 0111 1111 | 11 |
| 1111 0001 | 12 |
| 1111 0011 | 13 |
| 1111 0111 | 14 |
| 1111 1111 | 15 |

This table requires 256 entries though not all entries are significant. For this example multiple flags register 211 stores 01110011, thus the result $G_{out}$ is 9.

FIG. 13 illustrates a further alternative of this invention. In general, a threshold look-up table can define an arbitrary monotonic mapping between the input $G_{in}$, having for example 256 levels, and an output $G_{out}$ of fewer that 256 levels. The mapping can be made more efficient with certain constraints. The alternative approach is to fill a screening cell sequentially pixel by pixel. FIG. 13 illustrates this for a 4 by 4 cell. As the input gray level is increased, pixel 0 is gradually filled, followed by pixel 1 and so on as shown in the tone curves in FIG. 13. This mapping can be defined by a single threshold array as shown in the example in FIG. 13. Note that this representation is different from the threshold look-up tables described earlier as only one threshold is specified per pixel. For the case in which the output pixels $G_{out}$ are four bits, this results in a reduction of storage by a factor of 20.

Assuming a 4-bit pixel for $G_{out}$, the mapping between $G_{in}$ and $G_{out}$ for a threshold T can be reduced to a thresholding followed by clipping. The difference $G_{in}$-T is computed and then clipped to the interval (0,15). The output pixel value $G_{out}$ is the resultant value. This can be efficiently computed using the splittable arithmetic logic unit 230 of digital image/graphics processors 71, 72, 73 and 74. First, a register packed with input pixels is compared with a register packed with corresponding thresholds by subtraction.

$$(Pa:Pb:Pc:Pd) = (Ia:Ib:Ic:Id) - (Ta:Tb:Tc:Td)$$

where: (Pa:Pb:Pc:Pd) is the differences; (Ia:Ib:Ic:Id) is the corresponding input pixel values; and (Ta:Tb:Tc:Td) is the corresponding threshold values within the screening cell for that pixel. Multiple flags register 211 stores the carry outputs. If the I value is greater than the corresponding threshold value T, the status bit is 1. Otherwise the status bit is 0. Next the respective sections are clipped to a minimum value of 0. This involves expansion of the multiple flags register 211 using expansion circuit 238. As shown in Table 12, each bit of the four least significant bits of multiple flags register 211 into all 8 bits of a corresponding section. Those sections where the subtraction resulted in a difference less than zero are ANDed with the corresponding expanded 0's, thus clipping the differences to 0.

$$(Pa:Pb:Pc:Pd)=(Pa:Pb:Pc:Pd)\&@MF$$

where: @MF is the expansion of multiple flags register 211 via expansion circuit 238. In this logical operation sections where the carry out was 0, thus where $G_{in}$ was less than the corresponding threshold value and the difference was negative, are ANDed-with all 0's. This ensures a minimum difference value of 0 for each section. Next, the various sections of P1 are subtracted from a section equal to 15 or 00001111.

$$(Pa:Pb:Pc:Pd)=(15:15:15:15)-(Pa:Pb:Pc:Pd)$$

with the status bits accumulating in multiple flags register 211. The carry out status bit is 1 if 15 is less than the corresponding P value and 0 otherwise. The respective sections are then clipped to 15 using expansion of multiple flags register 211.

$$(Ga:Gb:Gc:Gd)=(15:15:15:15)\&@MF|(Pa:Pb:Pc:Pd)\&\sim@MF$$

For sections where 15–P was less than zero, i.e. P was greater than 15, @MF is all 1's and ~@MF is all 0's. Thus the first term of the OR is 15 and the second term of the OR is all 0's because ~@MF is all 0's. This limits the output value to 15. Sections where 15–P was equal to or greater than zero, i.e. P was less than 15, @MF is all 1's and ~@MF is all 0's. Thus the first term of the OR is all 0's and the second term of the OR is the respective P value. Thus each section of the output is limited to the range 0 to 15. This constrained threshold screening method can approach screening one pixel per cycle. This also provides a significant reduction in storage associated with threshold array.

The thresholding and clipping operation described above results in four significant pixels per processor section packed into a data word of 32 bits. These pixels can be packed so that they occupy 4-bit fields. This can be done efficiently by separating one processing one stream on even pixels (0,2, 4,6, . . . ) and a second stream on odd pixels (1,3,5,7, . . . ). The even pixels (Ea:Eb:Ec:Ed) can then be merged with the odd pixels (Oa:Ob:Oc:Od) as follows:

$$(Ga:Gb:Gc:Gd)=(Ea:Eb:Ec:Ed)|(Oa:Ob:Oc:Od)<<4$$

with the 4 bit shift placing the odd pixel values opposite the four most significant 0's in each even pixel sections. The OR operation thus merges the even and odd pixels.

What is claimed is:

1. A computer implemented method of approximating a gray scale tone with a more limited range image producer, comprising the steps of:
   packing an input pixel value into each equal section of a first data word;
   defining a plurality of threshold values;
   packing plural threshold values into equal sections of corresponding second data words, said threshold values within each second data word arranged in sets of reducing range;
   simultaneously comparing each section of said first data word with an initial second data word;
   selecting a next second data word in a based upon a result of said simultaneously comparing within a group with a next reduced range;
   simultaneously comparing each section of said first data word with said next second data word;
   repeating said steps of selecting a next second data word and simultaneously comparing until comparing each section of said first data word with a second data word having adjacent threshold values.

2. The method of claim 1, wherein:
   each of said steps of simultaneously comparing each section of said first data word with a second data word includes subtracting said second data word from said first data word and storing respective carry outs from each section;
   each of said steps of selecting a next second data word employs said stored respective carry outs from each section.

3. The method of claim 2, wherein:
   each of said second data words includes plural threshold values packed into equal sections in order from highest threshold value to lowest threshold value; and
   each of said steps of selecting a next second data word includes
      determining a left most one of said stored carry outs, and
      employing said determined left most one as an index into a table of said second data words.

4. The method of claim 3, further comprising the step of:
   calculating an output pixel value for each pixel based upon said stored carry outs of said subtractions.

5. The method of claim 3, wherein:
   said input pixel values and said threshold values are 8 bit quantities;
   said first data word consists of 4 instances of said input pixel value packed into 32 bits;
   each of said second data words consists of 4 threshold values packed into 32 bits;
   said plurality of threshold values consists of 65 threshold values from $T_0$ to $T_{63}$ in order of value from lowest to highest;
   said initial second data word consists of $(T_{48}:T_{32}:T_{16}:T_0)$;
   a second set of second data words of a first reduced range consists of

| Index | Thresholds |
| --- | --- |
| 1 | $T_{12} \, T_8 \, T_4 \, T_0$ |
| 2 | $T_{28} \, T_{24} \, T_{20} \, T_{16}$ |
| 3 | $T_{44} \, T_{40} \, T_{36} \, T_{32}$ |
| 4 | $T_{60} \, T_{56} \, T_{52} \, T_{48}$ | a third set of second data words of a second reduced range consists of

| Index | Thresholds |
| --- | --- |
| 5 | $T_3 \, T_2 \, T_1 \, T_0$ |
| 6 | $T_7 \, T_6 \, T_5 \, T_4$ |
| 10 | $T_{23} \, T_{22} \, T_{21} \, T_{20}$ |
| 11 | $T_{27} \, T_{26} \, T_{25} \, T_{24}$ |
| 12 | $T_{31} \, T_{30} \, T_{29} \, T_{28}$ |
| 13 | $T_{35} \, T_{34} \, T_{33} \, T_{32}$ |

-continued

| Index | Thresholds |
|---|---|
| 14 | $T_{39}\ T_{38}\ T_{37}\ T_{36}$ |
| 15 | $T_{43}\ T_{42}\ T_{41}\ T_{40}$ |
| 16 | $T_{47}\ T_{46}\ T_{45}\ T_{44}$ |
| 17 | $T_{51}\ T_{50}\ T_{49}\ T_{48}$ |
| 18 | $T_{55}\ T_{54}\ T_{53}\ T_{52}$ |
| 19 | $T_{59}\ T_{58}\ T_{57}\ T_{56}$ |
| 20 | $T_{63}\ T_{62}\ T_{61}\ T_{60}$ |

6. The method of claim 2, wherein:

each of said second data words includes plural threshold values packed into equal sections in order from highest threshold value to lowest threshold value; and each of said steps of selecting a next second data word includes employing said stored carry outs as an index into a table of said second data words.

7. The method of claim 6, further comprising the step of:

determining an output pixel value for each pixel employing a concatenation of all said stored carry outs as an index into a look-up table of output pixel values.

8. The method of claim 6, wherein:

said input pixel values and said threshold values are 8 bit quantities;

said first data word consists of 4 instances of said input pixel value packed into 32 bits;

each of said second data words consists of 4 threshold values packed into 32 bits;

said plurality of threshold values consists of 16 threshold values from $T_0$ to $T_{15}$ in order of value from lowest to highest;

said initial second data word consists of a second set of second data words of a first reduced range consists of

| Stored carry out bits | Thresholds |
|---|---|
| 0001 | $T_3\ T_2\ T_1\ T_0$ |
| 0011 | $T_7\ T_6\ T_5\ T_4$ |
| 0111 | $T_{11}\ T_{10}\ T_9\ T_8$ |
| 1111 | $T_{15}\ T_{14}\ T_{13}\ T_{12}$ | said look-up table of output pixel values consists of

| Stored carry out bits | Pixel output Value |
|---|---|
| 0001 0001 | 0 |
| 0001 0011 | 1 |
| 0001 0111 | 2 |
| 0001 1111 | 3 |
| 0011 0001 | 4 |
| 0011 0011 | 5 |
| 0011 0111 | 6 |
| 0011 1111 | 7 |
| 0111 0001 | 8 |
| 0111 0011 | 9 |
| 0111 0111 | 10 |
| 0111 1111 | 11 |
| 1111 0001 | 12 |
| 1111 0011 | 13 |
| 1111 0111 | 14 |
| 1111 1111 | 15 |

9. A printer comprising:

a transceiver adapted for bidirectional communication with a communications channel;

a memory;

a print engine adapted for placing color dots on a printed page according to received image data and control signals; and a programmable data processor connected to said transceiver, said memory and said print engine, said programmable data processor programmed to:

receive print data corresponding to pages to be printed from the communications channel via said transceiver;

convert said print data into image data and control signals for supply to said print engine for printing a corresponding page, said conversion including approximating a gray scale tone with a more limited range print engine by packing an input pixel value into each equal section of a first data word;

packing plural threshold values into equal sections of corresponding second data words, said threshold values within each second data word arranged in sets of reducing range;

simultaneously comparing each section of said first data word with an initial second data word;

selecting a next second data word in a based upon a result of said simultaneously comparing within a group with a next reduced range;

simultaneously comparing each section of said first data word with said next second data word;

repeating said steps of selecting a next second data word and simultaneously comparing until comparing each section of said first data word with a second data word having adjacent thresholds.

10. The printer of claim 9, wherein:

said programmable data processor includes a selectively splittable arithmetic logic unit, a multiple flags register connected to said arithmetic logic unit receiving and storing a carry out from each of said sections of said arithmetic logic unit, and said programmable data processor programmed to perform each of said simultaneous comparisons by subtracting said second data word from said first data word and storing respective carry outs from each section in said multiple flags register, perform each selection of a next second data word employing said carry outs stored in said multiple flags register.

11. The printer of claim 10, wherein:

said programmable data processor further includes a left most one unit having an input and generating a output indicative of the bit position of a left most one of said input, said programmable data processor further programmed to determine the left most one of said multiple flags register using said left most one unit, and employ said determined left most one as an index into a table of said second data words.

12. The printer of claim 11, wherein:

said programmable data processor is further programmed to calculate an output pixel value for each pixel based upon carry outs stored in said multiple flags register.

13. The printer of claim 10, wherein:

said programmable data processor is further programmed to employ said carry outs stored in said multiple flags register as an index into a table of said second data words.

14. The printer of claim 13, wherein:

said multiple flags register left shifts prior carry outs before storing carry outs from respective sections of said arithmetic logic unit; and said programmable data processor determines an output pixel value for each pixel employing all said carry outs stored in said multiple flags register as an index into a look-up table of output pixel values.

* * * * *